US011282385B2

(12) United States Patent
Lewis et al.

(10) Patent No.: US 11,282,385 B2
(45) Date of Patent: Mar. 22, 2022

(54) SYSTEM AND METHOD OF OBJECT-BASED NAVIGATION

(71) Applicant: QUALCOMM Incorporated, San Diego, CA (US)

(72) Inventors: M Anthony Lewis, La Jolla, CA (US); Richard Anthony Calle, San Francisco, CA (US); Charles Bergan, Cardiff, CA (US)

(73) Assignee: Qualcomm Incorproated, San Diego, CA (US)

( * ) Notice: Subject to any disclaimer, the term of this patent is extended or adjusted under 35 U.S.C. 154(b) by 254 days.

(21) Appl. No.: 15/961,829

(22) Filed: Apr. 24, 2018

(65) Prior Publication Data

US 2019/0325746 A1 Oct. 24, 2019

(51) Int. Cl.
*G08G 1/0968* (2006.01)
*G06K 9/00* (2006.01)
*G06N 3/02* (2006.01)
*G06F 3/01* (2006.01)
*G06T 7/246* (2017.01)
*G01C 21/34* (2006.01)

(52) U.S. Cl.
CPC ... *G08G 1/096816* (2013.01); *G01C 21/3453* (2013.01); *G06F 3/013* (2013.01); *G06K 9/00791* (2013.01); *G06K 9/00845* (2013.01); *G06N 3/02* (2013.01); *G06T 7/246* (2017.01); *G08G 1/096872* (2013.01)

(58) Field of Classification Search
CPC ........ G08G 1/096816; G08G 1/096872; G06T 7/246; G01C 21/3453; G06F 3/013; G06K 9/00791; G06K 9/00845; G06N 3/02

See application file for complete search history.

(56) References Cited

U.S. PATENT DOCUMENTS 7,912,637 B2 * 3/2011 Horvitz .............. G01C 21/3476
701/33.4
8,620,570 B2 * 12/2013 Baudisch ............... G01C 21/36
701/300

(Continued)

FOREIGN PATENT DOCUMENTS

EP 1378724 A1 1/2004

OTHER PUBLICATIONS

International Search Report and Written Opinion—PCT/US2019/027728—ISA/EPO—dated Jul. 22, 2019.

*Primary Examiner* — Thomas E Worden
(74) *Attorney, Agent, or Firm* — Arent Fox, LLP

(57) ABSTRACT

In an aspect of the disclosure, a method, a computer-readable medium, and apparatus for operating a computational network are provided. The apparatus may obtain a set of navigational instructions describing a route to a destination. The apparatus may obtain first image data through a first camera that is oriented toward the route, the first image data depicting a first scene associated with the route. The apparatus may determine a first field of view associated with a user that is navigating the route to the destination based on a first sensor that is oriented toward the user. The apparatus may identify at least one salient object represented in the first scene based on the first field of view. The apparatus may output instructional information describing a first navigational instruction of the set of navigational instructions with reference to the at least one salient object.

25 Claims, 13 Drawing Sheets

(56) References Cited

U.S. PATENT DOCUMENTS

| | | | |
|---|---|---|---|
| 9,417,069 B2* | 8/2016 | Gupta | G01C 21/00 |
| 9,586,525 B2* | 3/2017 | Sejalon | B60R 1/00 |
| 2007/0219720 A1* | 9/2007 | Trepagnier | B60W 30/095 |
| | | | 701/300 |
| 2010/0315215 A1* | 12/2010 | Yuda | H04N 5/2259 |
| | | | 340/435 |
| 2015/0160033 A1* | 6/2015 | Censo | G01C 21/3626 |
| | | | 701/400 |
| 2016/0016663 A1* | 1/2016 | Stanek | B60R 16/02 |
| | | | 701/3 |
| 2016/0283864 A1* | 9/2016 | Towal | G06K 9/6272 |
| 2016/0349059 A1* | 12/2016 | McGuire | G01C 21/32 |
| 2017/0206440 A1* | 7/2017 | Schrier | G06T 5/002 |
| 2017/0314954 A1* | 11/2017 | Golding | G01C 21/3602 |
| 2018/0086336 A1* | 3/2018 | Jones | B60W 10/18 |
| 2018/0087907 A1* | 3/2018 | DeBitetto | G01C 21/30 |
| 2018/0233048 A1* | 8/2018 | Andersson | G06K 9/00805 |
| 2018/0267558 A1* | 9/2018 | Tiwari | G05D 1/0246 |
| 2018/0372875 A1* | 12/2018 | Juelsgaard | G05D 1/024 |
| 2019/0118814 A1* | 4/2019 | Wood | B60Q 1/44 |
| 2019/0179320 A1* | 6/2019 | Pacala | G01S 7/4808 |
| 2019/0199457 A1* | 6/2019 | Chopra | H04B 17/318 |
| 2019/0213290 A1* | 7/2019 | Delva | B60W 50/00 |
| 2019/0235504 A1* | 8/2019 | Carter | G05D 1/0231 |
| 2019/0377086 A1* | 12/2019 | Rogan | G01S 13/931 |
| 2019/0381999 A1* | 12/2019 | Yu | B60W 40/06 |
| 2020/0042001 A1* | 2/2020 | Chu | G05D 1/0088 |
| 2021/0247201 A1* | 8/2021 | Hori | G01C 21/367 |

* cited by examiner

SYSTEM AND METHOD OF OBJECT-BASED NAVIGATION

BACKGROUND

Field

Certain aspects of the present disclosure generally relate to machine learning and, more particularly, to improving systems and methods of providing navigational instructions using salient objects.

Background

An artificial neural network, which may include an interconnected group of artificial neurons (e.g., neuron models), is a computational device or represents a method to be performed by a computational device.

Convolutional neural networks are a type of feed-forward artificial neural network. Convolutional neural networks may include collections of neurons that each has a receptive field and that collectively tile an input space. Convolutional neural networks (CNNs) have numerous applications. In particular, CNNs have broadly been used in the area of pattern recognition and classification.

Deep learning architectures, such as deep belief networks and deep convolutional networks, are layered neural networks architectures in which the output of a first layer of neurons becomes an input to a second layer of neurons, the output of a second layer of neurons becomes and input to a third layer of neurons, and so on. Deep neural networks (DNNs) may be trained to recognize a hierarchy of features and so they have increasingly been used in object recognition applications. Like convolutional neural networks, computation in these deep learning architectures may be distributed over a population of processing nodes, which may be configured in one or more computational chains. These multi-layered architectures may be trained one layer at a time and may be fine-tuned using back propagation.

Other models are also available for object recognition. For example, support vector machines (SVMs) are learning tools that can be applied for classification. Support vector machines include a separating hyperplane (e.g., decision boundary) that categorizes data. The hyperplane is defined by supervised learning. A desired hyperplane increases the margin of the training data. In other words, the hyperplane should have the greatest minimum distance to the training examples.

Although these solutions achieve excellent results on a number of classification benchmarks, their computational complexity can be prohibitively high. Additionally, training of the models may be challenging.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

Navigational systems are ubiquitous across systems and devices. Often, these navigational systems are integrated within personal electronic devices (e.g., smartphones), vehicle computer systems, and so forth. Conventional navigation systems may rely on map-based navigation. With map-based navigation, navigational instructions are provided to a user with reference to a road name. Further, such map-based navigation typically provides a user with an absolute different between the position of the user and a road to which a user is to navigate (e.g., "turn right in 500 feet"). In some cases, a user may have difficulty resolving a road name and/or a distance, for example, when street signs are missing or occluded, when a road is circuitous, etc. Therefore, conventional navigation systems may prove difficult for users in various situations.

Psychological studies have indicated that people naturally use salient landmarks to localize themselves in an environment. Further, people typically use salient landmarks when communicating an instruction (e.g., "take a right at the school"). In order to address to problems with conventional navigation systems and to harmonize navigational instructions with natural language, a system may be provided that provides navigational instructions using salient objects, such as landmarks, vehicles, etc.

In an aspect of the disclosure, a method, a computer readable medium, and apparatus for operating a computational network are provided. The apparatus includes a memory and at least one processor coupled to the memory. The at least one processor may be configured to obtain a set of navigational instructions describing a route to a destination. The at least one processor may be configured to obtain first image data through a first camera that is oriented toward the route, the first image data depicting a first scene associated with the route. The at least one processor may be configured to determine a first field of view associated with a user that is navigating the route to the destination based on a first sensor that is oriented toward the user. The at least one processor may be configured to identify at least one salient object represented in the first scene based on the first field of view. The at least one processor may be configured to output instructional information describing a first navigational instruction of the set of navigational instructions with reference to the at least one salient object.

In an aspect, the first sensor comprises a second camera that is oriented toward the user. In an aspect, the at least one processor is further configured to obtain second image data that is captured through the second camera; determine a second field of view associated with the user based on the second image data; and store field-of-view information based on the second field of view, wherein the determination of the first field of view associated with the user that is navigating the route is based on the field-of-view information. In an aspect, the storage of the field-of-view information based on the second field of view comprises to store the field-of-view information based on the second field of view before the obtainment of the set of navigational instructions describing the route to the destination. In an aspect, the at least one processor is further configured to process the first image data using a first deep neural network (DNN) for identification of a set of objects represented in the first scene, wherein the identification of the at least one salient object represented in the first scene based on the first field of view is further based on the set of objects represented in the first scene. In an aspect, the identification of the at least one salient object represented in the first scene based on the first field of view comprises to process the set of objects using a second DNN for identification of the at least one salient object that is estimated to be at least partially within the first field of view. In an aspect, the at least one processor may be further configured to adjust one or more weights associated with the second DNN based on the first field of view. In an aspect, the one or more weights are adjusted based at least in part on a profile associated with the user, the profile being based on at least one of an age associated with the user, a sex associated with the user, a driving experience level associated with the user, a preference associated with the user, historical information associated with the user, or a location associated with the user. In an aspect, the instructional information is configured to be output through at least one of audio presentation or visual presentation. In an aspect, the first image data depicts the first scene over a plurality of time steps, and the at least one salient object is in motion over the plurality of time steps. In an aspect, the at least one processor is further configured to determine the at least one salient object is in motion, wherein the instructional information describing the first navigational instruction of the set of navigational instructions with reference to the at least one salient object is based on the motion of the at least one salient object.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Figure 1:
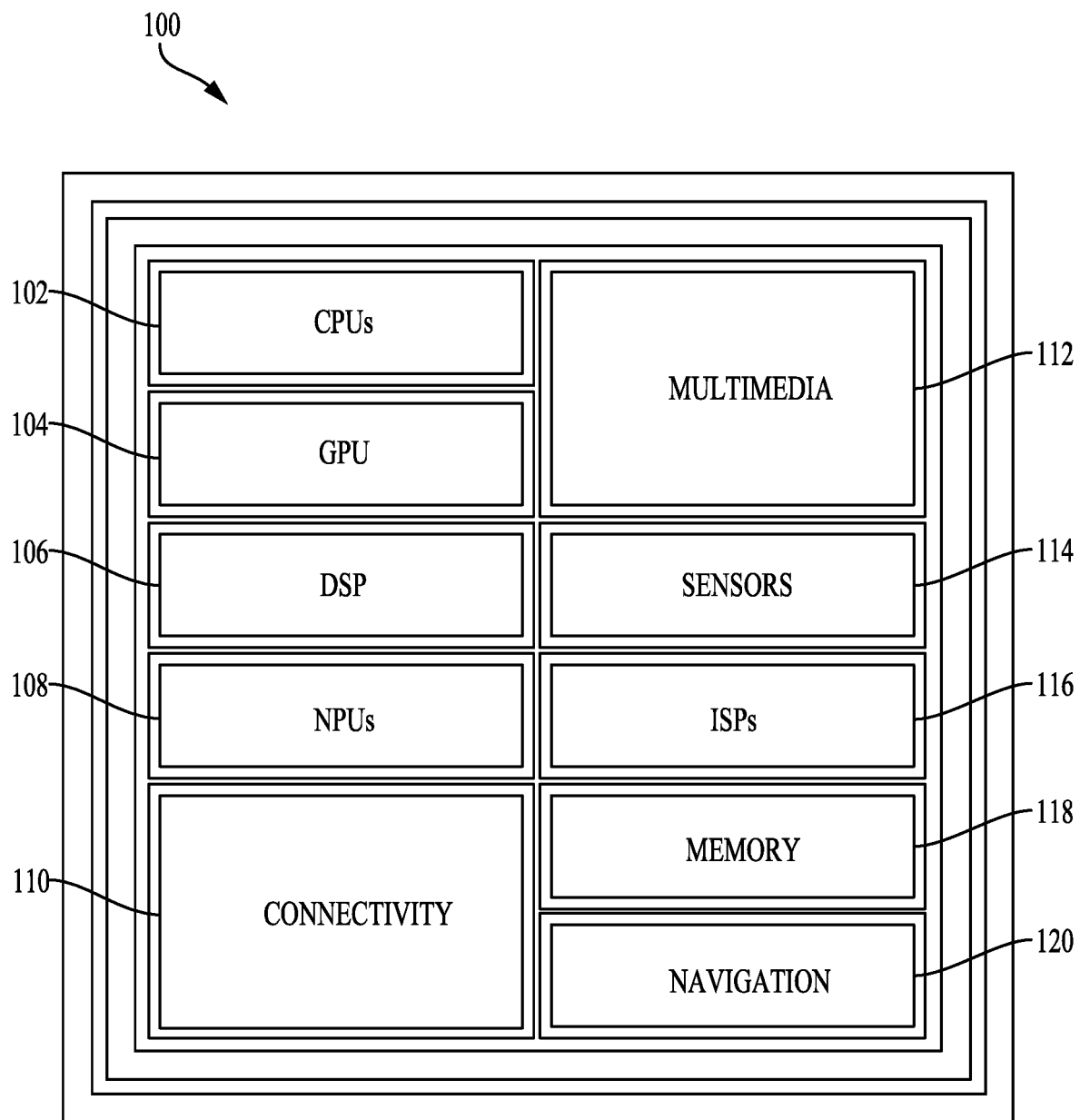
FIG. 1 illustrates an example implementation of designing a neural network using a system-on-a-chip (SOC), including a general-purpose processor, in accordance with certain aspects of the present disclosure.

FIG. 1 illustrates an example implementation of the aforementioned system for providing object-based navigational instructions using a system-on-a-chip (SOC) 100, which may include a general-purpose processor (CPU) or multi-core general-purpose processors (CPUs) 102 in accordance with certain aspects of the present disclosure. Variables (e.g., neural signals and synaptic weights), system parameters associated with a computational device (e.g., neural network with weights), delays, frequency bin information, and task information may be stored in a memory block associated with a Neural Processing Unit (NPU) 108, in a memory block associated with a CPU 102, in a memory block associated with a graphics processing unit (GPU) 104, in a memory block associated with a digital signal processor (DSP) 106, in a dedicated memory block 118, or may be distributed across multiple blocks. Instructions executed at the general-purpose processor 102 may be loaded from a program memory associated with the CPU 102 or may be loaded from a dedicated memory block 118.

The SOC 100 may also include additional processing blocks tailored to specific functions, such as a GPU 104, a DSP 106, a connectivity block 110, which may include fourth generation long term evolution (4G LTE) connectivity, unlicensed Wi-Fi connectivity, USB connectivity, Bluetooth connectivity, and the like, and a multimedia processor 112 that may, for example, detect and recognize gestures. In one implementation, the NPU is implemented in the CPU, DSP, and/or GPU. The SOC 100 may also include a sensor processor 114, image signal processors (ISPs), and/or navigation 120, which may include a global positioning system.

The SOC 100 may be based on an ARM instruction set. In an aspect of the present disclosure, the instructions loaded into the general-purpose processor 102 may include code to obtain a set of navigational instructions describing a route to a destination. The instructions may include code to obtain first image data through a first camera that is oriented toward the route, the first image data depicting a first scene associated with the route. The instructions may include code to determine a first field of view associated with a user that is navigating the route to the destination based on a first sensor that is oriented toward the user. The instructions may include code to identify at least one salient object represented in the first scene based on the first field of view. The instructions may include code to output instructional information describing a first navigational instruction of the set of navigational instructions with reference to the at least one salient object.

In an aspect, the first sensor comprises a second camera that is oriented toward the user. In an aspect, the instructions may include code to obtain second image data that is captured through the second camera; determine a second field of view associated with the user based on the second image data; and store field-of-view information based on the second field of view, wherein the determination of the first field of view associated with the user that is navigating the route is based on the field-of-view information. In an aspect, the storage of the field-of-view information based on the second field of view comprises to store the field-of-view information based on the second field of view before the obtainment of the set of navigational instructions describing the route to the destination. In an aspect, the instructions may include code to process the first image data using a first deep neural network (DNN) for identification of a set of objects represented in the first scene, wherein the identification of the at least one salient object represented in the first scene based on the first field of view is further based on the set of objects represented in the first scene. In an aspect, the identification of the at least one salient object represented in the first scene based on the first field of view comprises to process the set of objects using a second DNN for identification of the at least one salient object that is estimated to be at least partially within the first field of view. In an aspect, the instructions may include code to adjust one or more weights associated with the second DNN based on the first field of view. In an aspect, the one or more weights are adjusted based at least in part on a profile associated with the user, the profile being based on at least one of an age associated with the user, a sex associated with the user, a driving experience level associated with the user, a preference associated with the user, historical information associated with the user, or a location associated with the user. In an aspect, the instructional information is configured to be output through at least one of audio presentation or visual presentation. In an aspect, the first image data depicts the first scene over a plurality of time steps, and the at least one salient object is in motion over the plurality of time steps. In an aspect, the instructions may include code to determine the at least one salient object is in motion, wherein the instructional information describing the first navigational instruction of the set of navigational instructions with reference to the at least one salient object is based on the motion of the at least one salient object.

Figure 2:
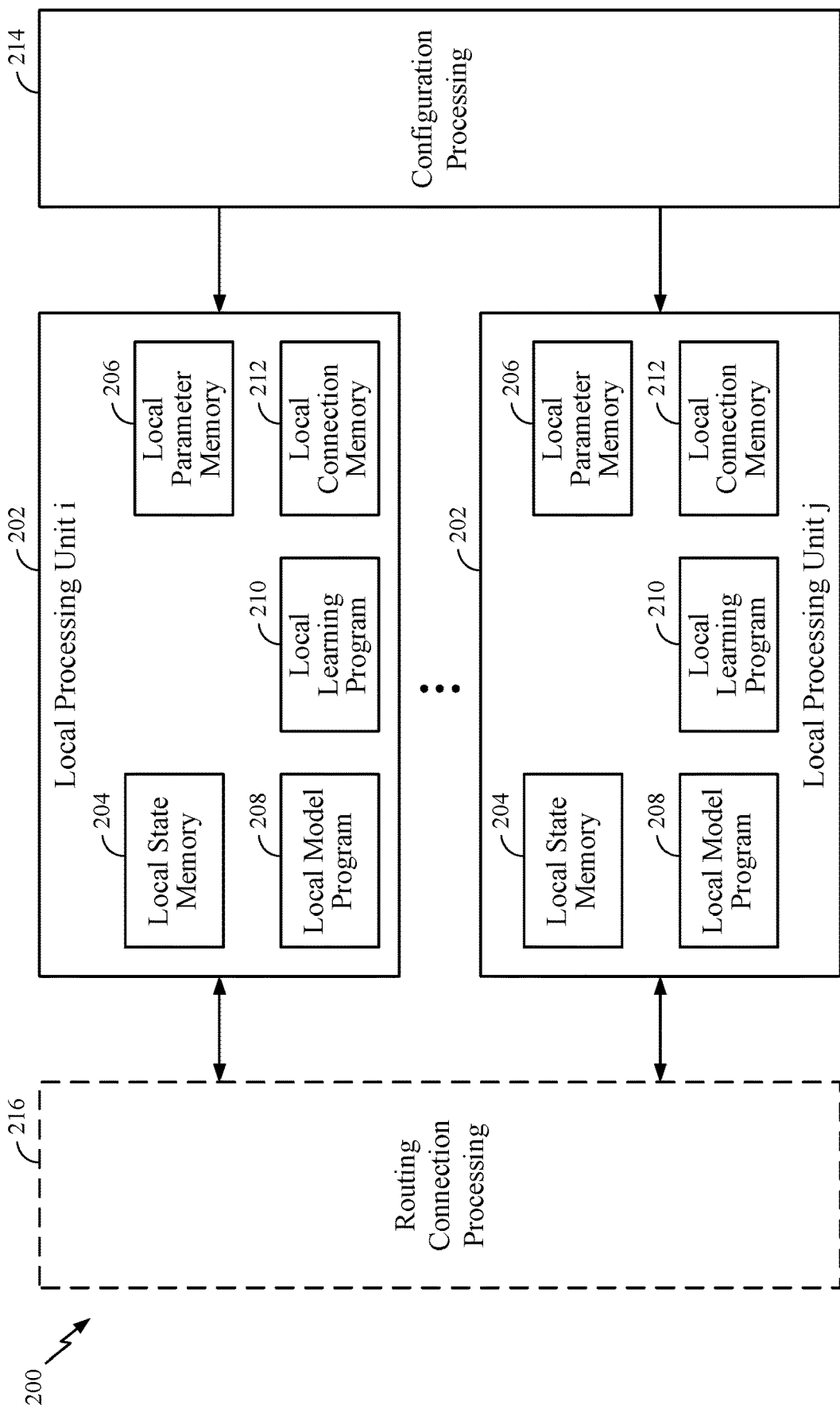
FIG. 2 illustrates an example implementation of a system, in accordance with aspects of the present disclosure.

FIG. 2 illustrates an example implementation of a system 200 in accordance with certain aspects of the present disclosure. As illustrated in FIG. 2, the system 200 may have one or more local processing units 202 that may perform various operations of methods described herein. Each local processing unit 202 may include a local state memory 204 and a local parameter memory 206 that may store parameters of a neural network. In addition, the local processing unit 202 may have a local (neuron) model program (LMP) memory 208 for storing a local model program, a local learning program (LLP) memory 210 for storing a local learning program, and a local connection memory 212. Furthermore, as illustrated in FIG. 2, each local processing unit 202 may interface with a configuration processor unit 214 for providing configurations for local memories of the local processing unit, and with a routing connection processing unit 216 that provides routing between the local processing units 202.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 3A:
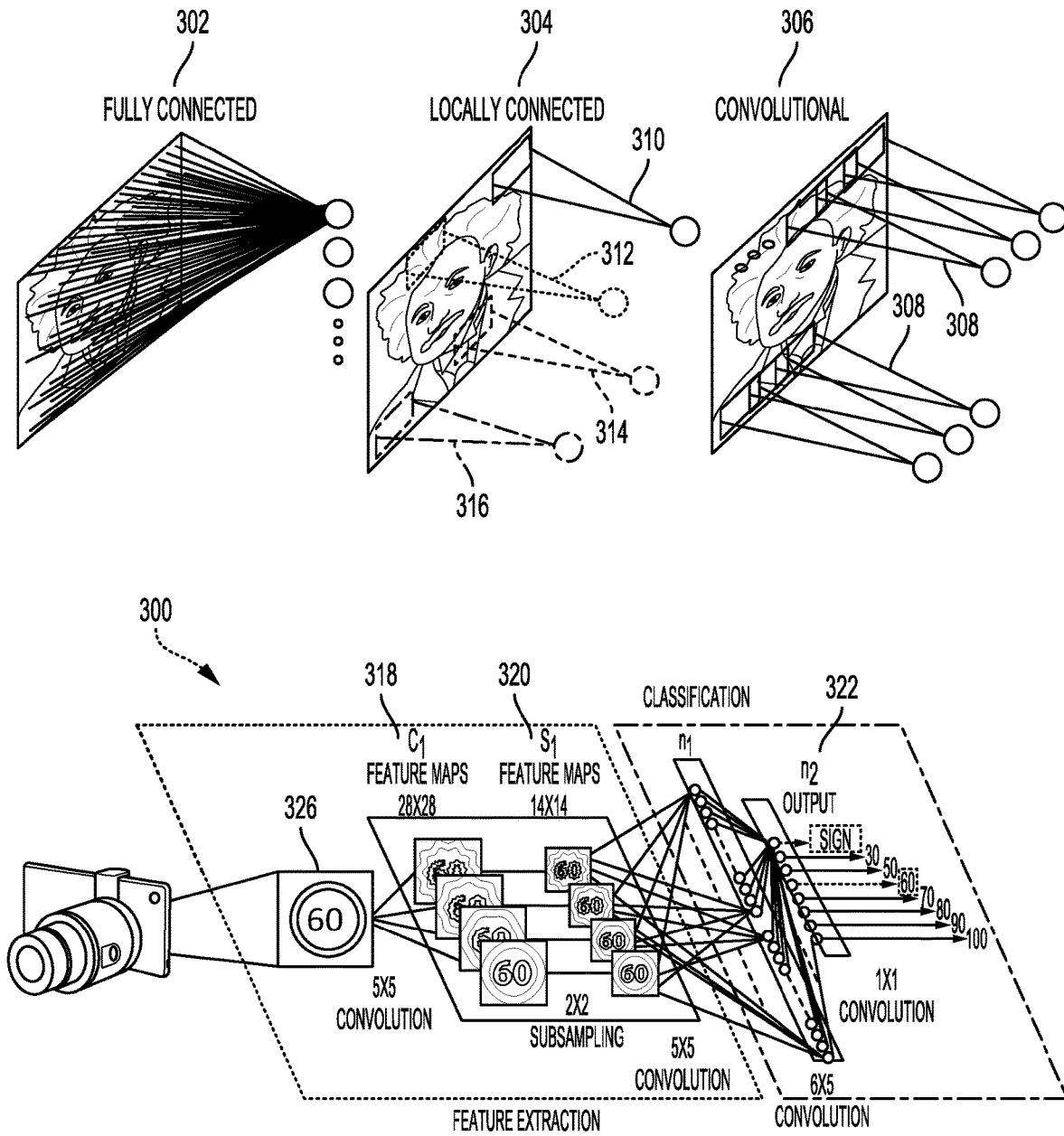
FIG. 3A is a diagram illustrating a neural network, in accordance with aspects of the present disclosure.

Referring to FIG. 3A, the connections between layers of a neural network may be fully connected 302 or locally connected 304. In a fully connected network 302, a neuron in a first layer may communicate its output to every neuron in a second layer, so that each neuron in the second layer will receive input from every neuron in the first layer. Alternatively, in a locally connected network 304, a neuron in a first layer may be connected to a limited number of neurons in the second layer. A convolutional network 306 may be locally connected, and is further configured such that the connection strengths associated with the inputs for each neuron in the second layer are shared (e.g., 308). More generally, a locally connected layer of a network may be configured so that each neuron in a layer will have the same or a similar connectivity pattern, but with connections strengths that may have different values (e.g., 310, 312, 314, and 316). The locally connected connectivity pattern may give rise to spatially distinct receptive fields in a higher layer, because the higher layer neurons in a given region may receive inputs that are tuned through training to the properties of a restricted portion of the total input to the network.

Locally connected neural networks may be well suited to problems in which the spatial location of inputs is meaningful. For instance, a network 300 designed to recognize visual features from a car-mounted camera may develop high layer neurons with different properties depending on their association with the lower versus the upper portion of the image. Neurons associated with the lower portion of the image may learn to recognize lane markings, for example, while neurons associated with the upper portion of the image may learn to recognize traffic lights, traffic signs, and the like.

A deep convolutional network (DCN) may be a network of convolutional network(s), configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that includes recurrent or feedback connections.

A DCN may be trained with supervised learning. During training, a DCN may be presented with an image, such as a cropped image of a speed limit sign 326, and a "forward pass" may then be computed to produce an output 322. The output 322 may be a vector of values corresponding to features such as "sign," "60," and "100." The network designer may want the DCN to output a high score for some of the neurons in the output feature vector, for example the ones corresponding to "sign" and "60" as shown in the output 322 for a network 300 that has been trained. Before training, the output produced by the DCN is likely to be incorrect, and so an error may be calculated between the actual output and the target output. The weights of the DCN may then be adjusted so that the output scores of the DCN are more closely aligned with the target.

To adjust the weights, a learning algorithm may compute a gradient vector for the weights. The gradient may indicate an amount that an error would increase or decrease if the weight were adjusted slightly. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted so as to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level.

After learning, the DCN may be presented with new images 326 and a forward pass through the network may yield an output 322 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer 318 and 320, with each element of the feature map (e.g., 320) receiving input from a range of neurons in the previous layer (e.g., 318) and from each of the multiple channels. The values in the feature map may be further processed with a non-linearity, such as a rectification, max(0,x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern DNNs are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 3B:
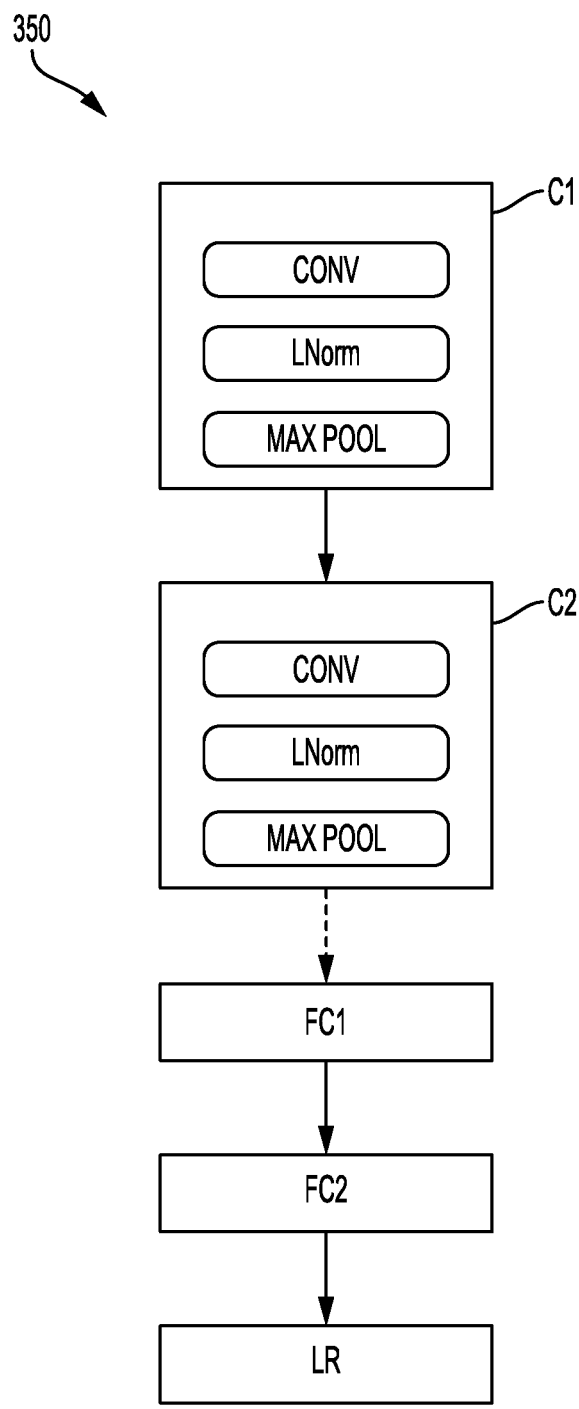
FIG. 3B is a block diagram illustrating an exemplary deep convolutional network (DCN), in accordance with aspects of the present disclosure.

FIG. 3B is a block diagram illustrating an exemplary deep convolutional network 350. The deep convolutional network 350 may include multiple different types of layers based on connectivity and weight sharing. As shown in FIG. 3B, the exemplary deep convolutional network 350 includes multiple convolution blocks (e.g., C1 and C2). Each of the convolution blocks may be configured with a convolution layer, a normalization layer (LNorm), and a pooling layer. The convolution layers may include one or more convolutional filters, which may be applied to the input data to generate a feature map. Although only two convolution blocks are shown, the present disclosure is not so limiting, and instead, any number of convolutional blocks may be included in the deep convolutional network 350 according to design preference. The normalization layer may be used to normalize the output of the convolution filters. For example, the normalization layer may provide whitening or lateral inhibition. The pooling layer may provide down sampling aggregation over space for local invariance and dimensionality reduction.

The parallel filter banks, for example, of a deep convolutional network may be loaded on a CPU 102 or GPU 104 of an SOC 100, optionally based on an ARM instruction set, to achieve high performance and low power consumption. In alternative embodiments, the parallel filter banks may be loaded on the DSP 106 or an ISP 116 of an SOC 100. In addition, the DCN may access other processing blocks that may be present on the SOC, such as processing blocks dedicated to sensors 114 and navigation 120.

The deep convolutional network 350 may also include one or more fully connected layers (e.g., FC1 and FC2). The deep convolutional network 350 may further include a logistic regression (LR) layer. Between each layer of the deep convolutional network 350 are weights (not shown) that are to be updated. The output of each layer may serve as an input of a succeeding layer in the deep convolutional network 350 to learn hierarchical feature representations from input data (e.g., images, audio, video, sensor data and/or other input data) supplied at the first convolution block C1.

Figure 4:
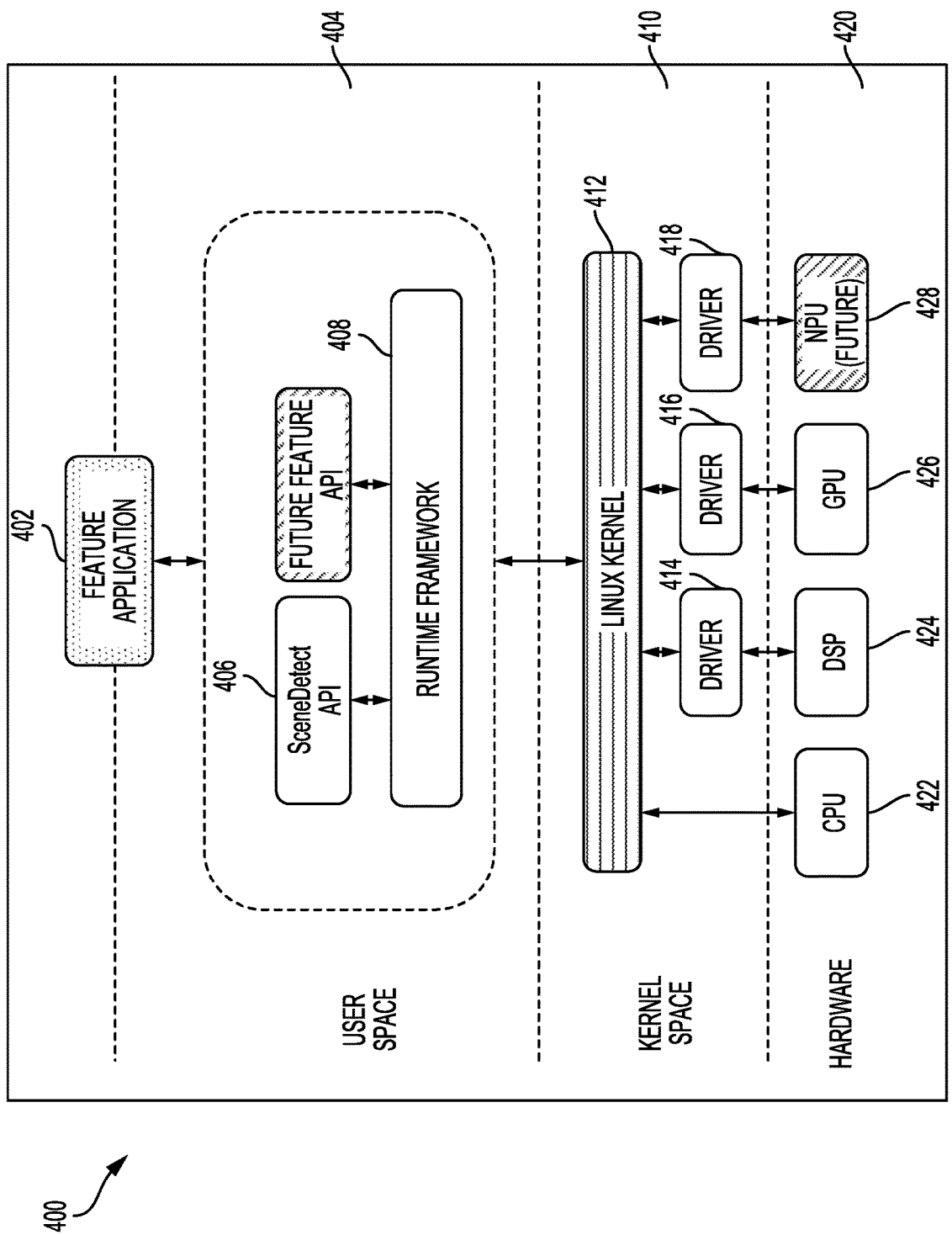
FIG. 4 is a block diagram illustrating an exemplary software architecture that may modularize artificial intelligence (AI) functions, in accordance with aspects of the present disclosure.

FIG. 4 is a block diagram illustrating an exemplary software architecture 400 that may modularize artificial intelligence (AI) functions. Using the architecture, applications 402 may be designed that may cause various processing blocks of an SOC 420 (for example a CPU 422, a DSP 424, a GPU 426 and/or an NPU 428) to perform supporting computations during run-time operation of the application 402.

The AI application 402 may be configured to call functions defined in a user space 404 that may, for example, provide for the detection and recognition of a scene indicative of the location in which the device currently operates. The AI application 402 may, for example, configure a microphone and a camera differently depending on whether the recognized scene is an office, a lecture hall, a restaurant, or an outdoor setting such as a lake. The AI application 402 may make a request to compiled program code associated with a library defined in a SceneDetect application programming interface (API) 406 to provide an estimate of the current scene. This request may ultimately rely on the output of a deep neural network configured to provide scene estimates based on video and positioning data, for example.

A run-time engine 408, which may be compiled code of a Runtime Framework, may be further accessible to the AI application 402. The AI application 402 may cause the run-time engine, for example, to request a scene estimate at a particular time interval or triggered by an event detected by the user interface of the application. When caused to estimate the scene, the run-time engine may in turn send a signal to an operating system 410, such as a Linux Kernel 412, running on the SOC 420. The operating system 410, in turn, may cause a computation to be performed on the CPU 422, the DSP 424, the GPU 426, the NPU 428, or some combination thereof. The CPU 422 may be accessed directly by the operating system, and other processing blocks may be accessed through a driver, such as a driver 414-418 for a DSP 424, for a GPU 426, or for an NPU 428. In the exemplary example, the deep neural network may be configured to run on a combination of processing blocks, such as a CPU 422 and a GPU 426, or may be run on an NPU 428, if present.

Figure 5:
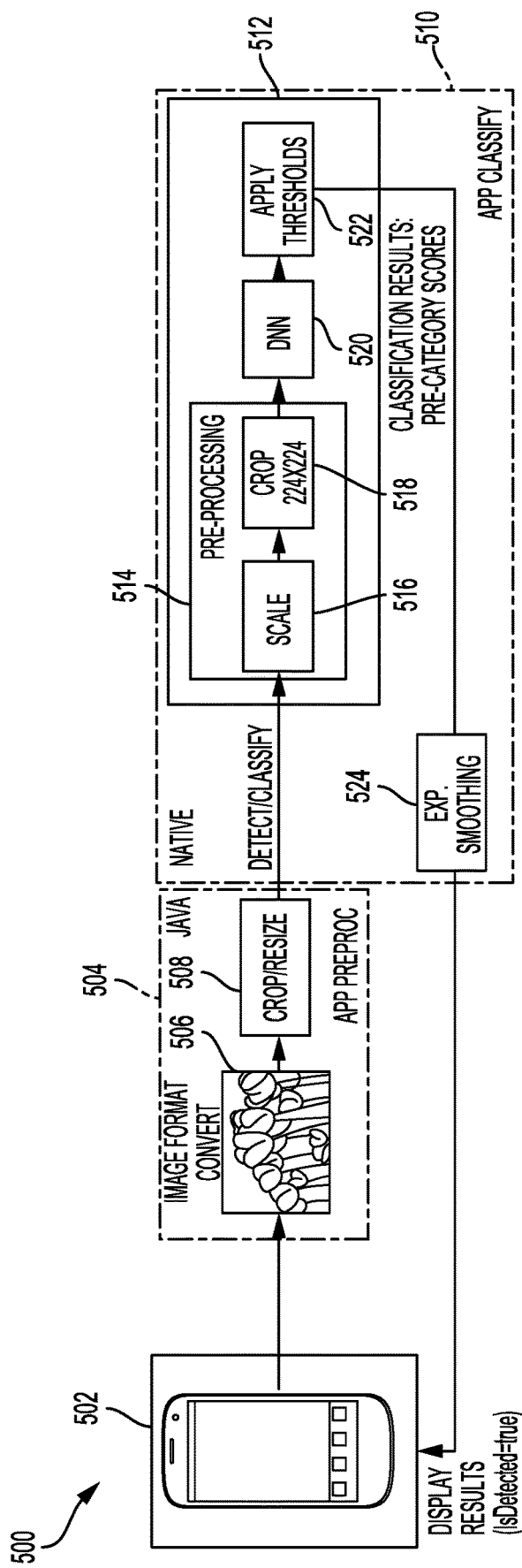
FIG. 5 is a block diagram illustrating the run-time operation of an AI application on a smartphone, in accordance with aspects of the present disclosure.

FIG. 5 is a block diagram illustrating the run-time operation 500 of an AI application on a smartphone 502. The AI application may include a pre-process unit 504 that may be configured (using for example, the JAVA programming language) to convert the format of an image 506 and then crop and/or resize the image 508. The pre-processed image may then be communicated to a classify application 510 that contains a SceneDetect Backend Engine 512 that may be configured (using for example, the C programming language) to detect and classify scenes based on visual input. The SceneDetect Backend Engine 512 may be configured to further preprocess 514 the image by scaling 516 and cropping 518. For example, the image may be scaled and cropped so that the resulting image is 224 pixels by 224 pixels. These dimensions may map to the input dimensions of a neural network. The neural network may be configured by a deep neural network block 520 to cause various processing blocks of the SOC 100 to further process the image pixels with a deep neural network. The results of the deep neural network may then be thresholded 522 and passed through an exponential smoothing block 524 in the classify application 510. The smoothed results may then cause a change of the settings and/or the display of the smartphone 502.

Figure 6:
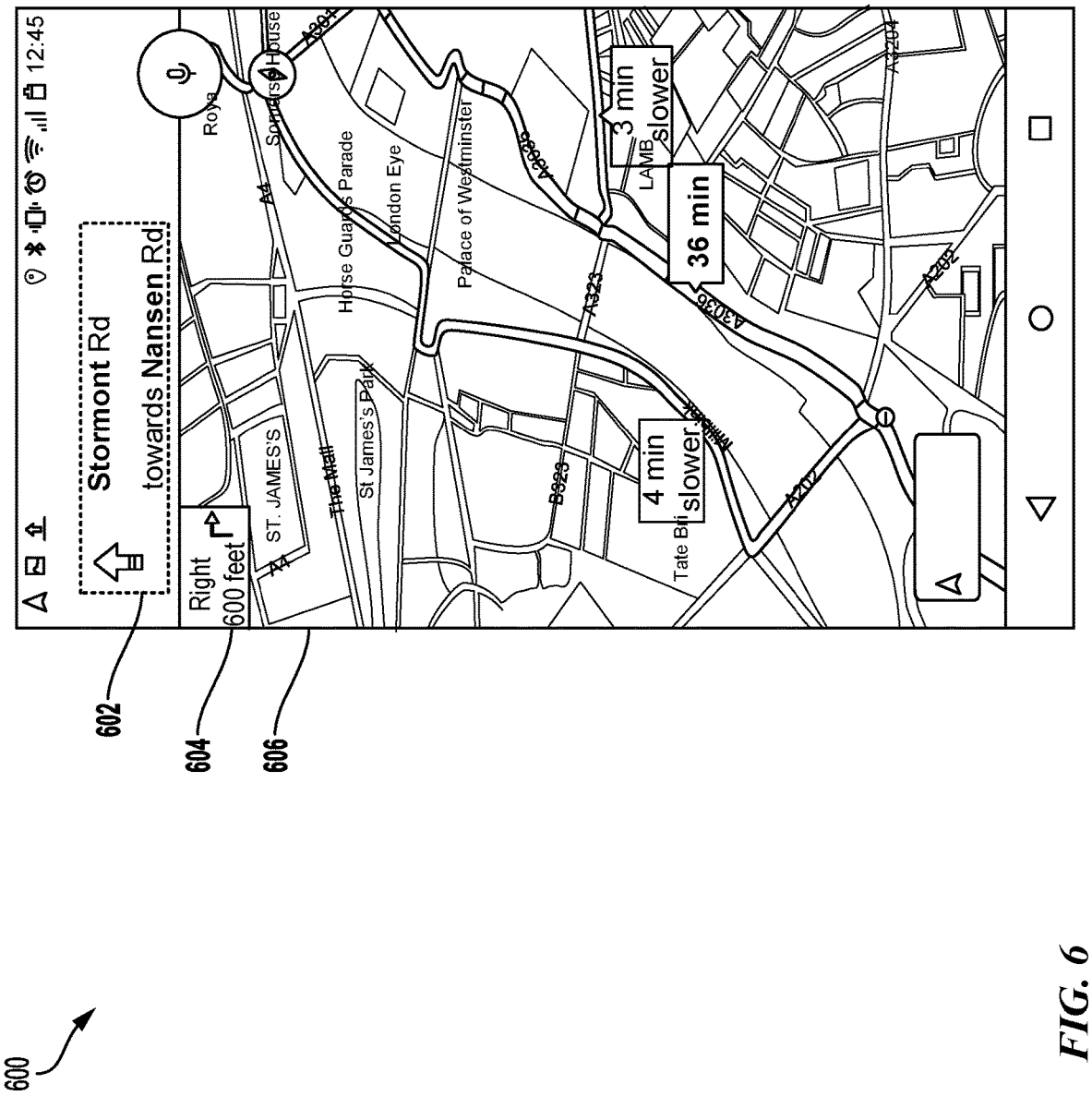
FIG. 6 is a display provided by a navigational system, in accordance with aspects of the present disclosure.

FIG. 6 illustrates a display 600 of a navigation system. The navigation system associated with the display 600 may be based on a map, as shown in the map display 606. With map-based navigation, a navigational instruction 604 are provided to a user with reference to a road name. Further, such map-based navigation typically provides a user with an absolute different between the position of the user and a road to which a user is to navigate, as shown in the navigational instruction 604 (e.g., "turn right in 600 feet"). In some cases, a user may have difficulty resolving a road name and/or a distance, for example, when street signs are missing or occluded, when a road is circuitous, etc. Therefore, the navigational instruction 604 may prove difficult for a user to follow. Aspects of the present disclosure may provide a system and method for providing navigational instructions using salient objects, such as landmarks, vehicles, etc. When a user is presented with navigational instructions that are based on salient objects, the user may find navigating a route to be easier and more intuitive.

Figure 7:
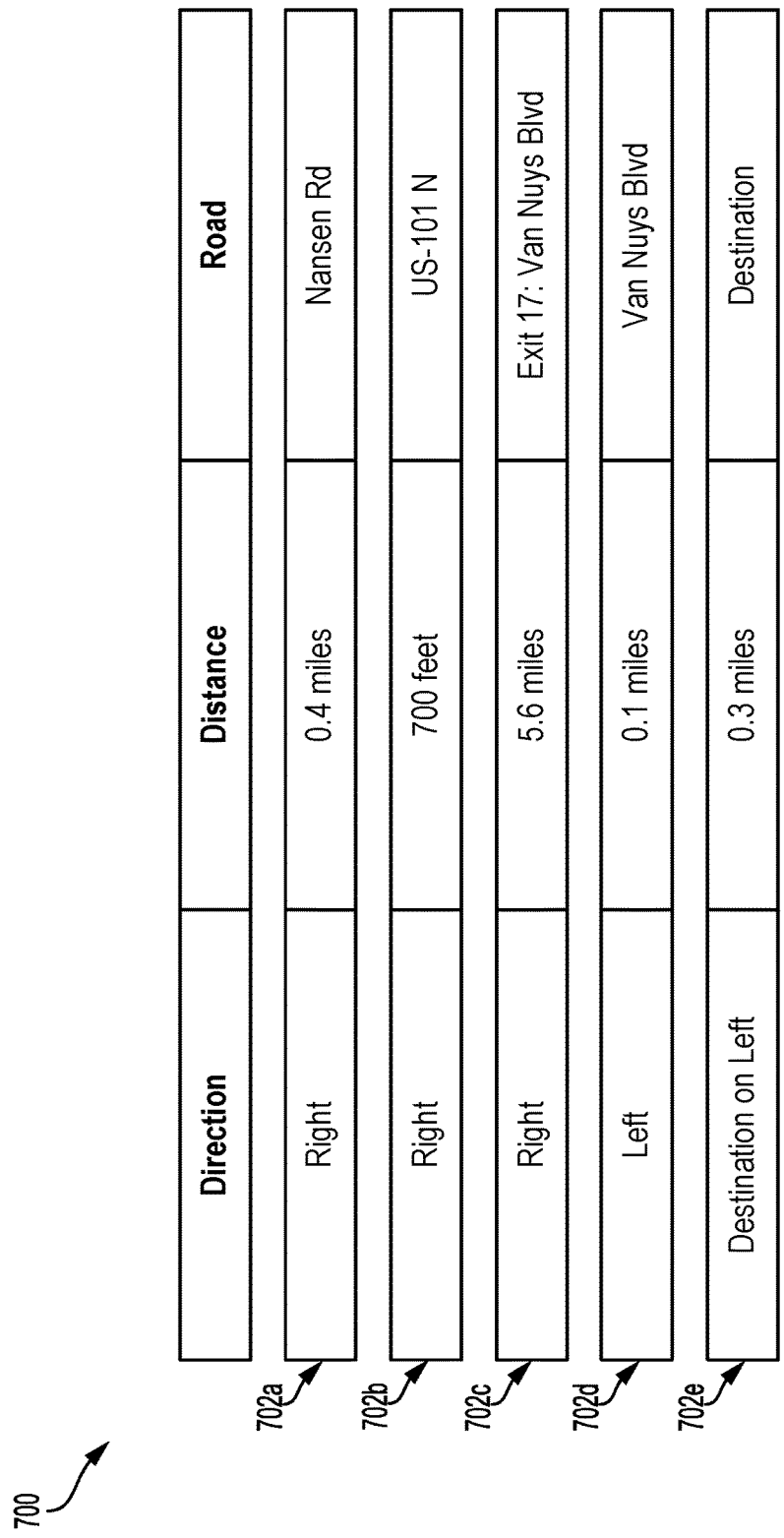
FIG. 7 is a set of navigational instructions, in accordance with aspects of the present disclosure.

FIG. 7 illustrates an example of a set of navigational instructions 700. The set of navigational instructions 700 may be provided by a navigation system. For example, a navigation system may allow a user to input a destination (e.g., a street address of a destination, a specific location, a general location, etc.). The navigational system may calculate a route between a beginning point (e.g., the user's current location) and a destination. The navigational system may separate the route into discrete steps, as shown by each navigational instruction 702*a-e*. Each navigational instruction 702*a-e* may indicate a distance to a next navigational point (e.g., turn, bearing, heading, etc.), the next navigational point (e.g., road name, traffic circle, etc.), and the direction along the route at the next navigational point (e.g., "right," "left," "straight," etc.). For example, a first navigational instruction for navigating a route to a destination may indicate that the user is to turn right in 0.4 miles at Nansen Road in order to continue navigating the route.

The set of navigational instructions 700 is intended to be illustrative. Other configurations for sets of navigational instructions are comprehended by the present disclosure. For example, the set of navigational instructions 700 illustrate a text output that may be comprehensible by a user, but the set of navigational instructions 700 may be stored as vector data or another type of data.

Figure 8:
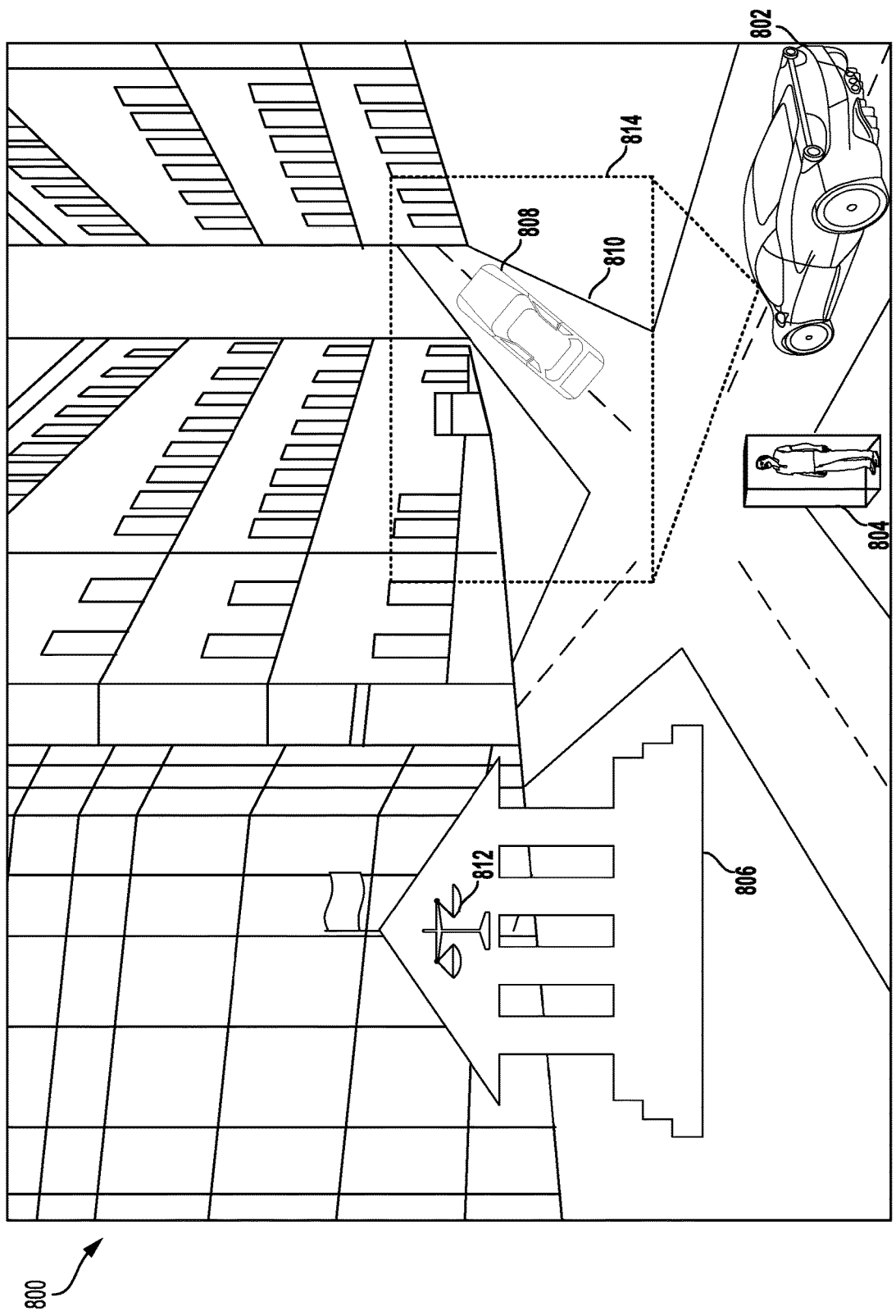
FIG. 8 is an environment in which a user navigating a vehicle may be provided object-based navigational instructions, in accordance with aspects of the present disclosure.

FIG. 8 illustrates an environment 800 in which a user in a vehicle 802 is navigating a route. The user in the vehicle 802 may have access to a navigational system as described herein. As illustrated in the environment, the vehicle 802 may be approaching an intersection. By way of example, a set of navigational instructions 700 may guide a user along a route to a destination. For example, the vehicle 802 may be traveling along a first road, and may be intended to turn right at the intersection onto a second road 810. For example, a first navigational instruction 702*a* may instruct the user to turn the vehicle 802 right at the second road 810.

A user (e.g., driver) of the vehicle 802 may have a limited field of view. That is, the user may be unable to see all of the environment 800, and may have a field of view 814. In the field of view 814, the user may be more likely to observe objects (e.g., the car 808) and find those objects salient. The field of view 814 may be associated with an orientation of the user's head, such as a direction of the user's gaze and/or an elevation of the user's gaze. The field of view 814 is intended to be illustrative, and the user may have a different field of view in order to view more or fewer objects (e.g., the person 804, the courthouse 806, the sign 812, etc.).

As the vehicle 802 approaches the intersection at which the first navigational instruction 702*a* indicates that a right turn is to be made, a set of objects 804, 806, 808, 812 may be proximately disposed to the vehicle 802. For example, a person 804 may be located at a near left corner of the intersection with the second road 810, relative to a field of view 814 of the user of the user in the vehicle 802. In another example, a courthouse 806 may be located at a far left corner of the intersection with the second road 810, relative to the field of view 814 of the user in the vehicle 802. In another example, a car 808 may be traveling along the second road 810 in the direction consistent with the first navigational instruction 702*a*.

As described herein, one or more of the aforementioned objects 804, 806, 808, 812 may be used to describe the first navigational instruction 702*a*. Accordingly, the user of the vehicle 802 may be provided with a navigational instruction that indicates a salient object at least partially within the field of view 814 of the user of the vehicle 802.

Figure 9:
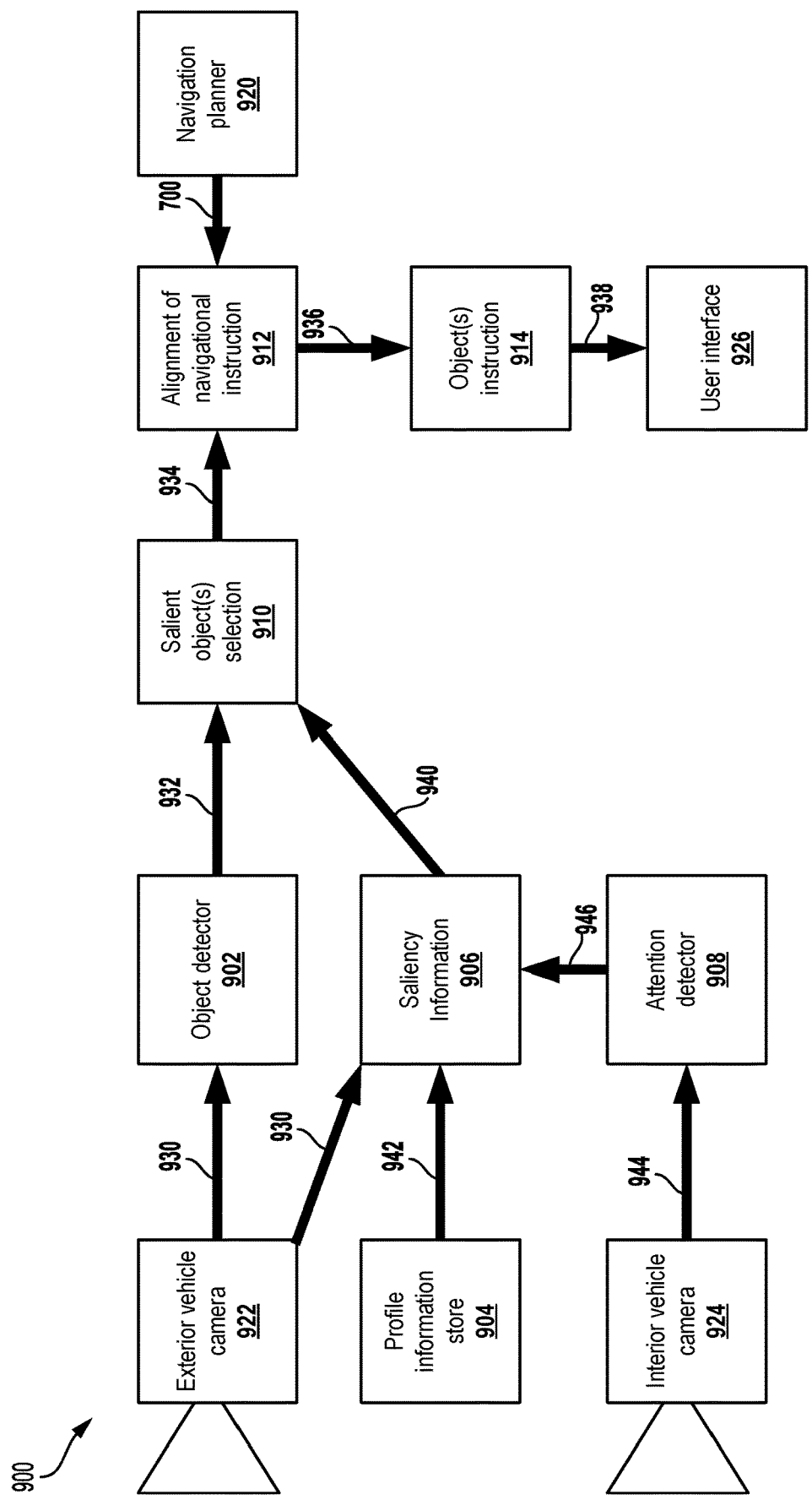
FIG. 9 is an example system architecture for providing object-based navigational instructions, in accordance with aspects of the present disclosure.

FIG. 9 illustrates an example system architecture 900 for providing object-based navigational instructions. In one aspect, the example system architecture 900 may be at least partially integrated with and/or communicatively coupled with a computer system of the vehicle 802. In one aspect, the example system architecture 900 may be at least partially integrated with and/or communicatively coupled with a personal electronic device (e.g., smartphone) of a user of the vehicle 802. In one aspect, the example system architecture 900 may be at least partially integrated within and/or communicatively coupled with a cloud-based computing system.

The example system architecture 900 may include and/or may be communicatively coupled with a navigation planner 920. The navigation planner 920 may be configured to generate a set of navigational instructions 700. The navigation planner 920 may include a global navigation satellite system (GNSS)-based navigation system, such as a program at least partially implemented as software and including and/or communicatively coupled with a GNSS-positioning component. An example of a GNSS-based navigation system may include a global-position system (GPS) navigation system that includes a GPS-positioning component.

The navigation planner 920 may be configured to determine a set of navigational instructions 700. For example, the navigation planner 920 may be provided a destination (e.g., via user input). Based on the destination, the navigation planner 920 may determine a route between a starting point (e.g., the current location of the vehicle) and the destination. The navigation planner 920 may determine the route as the set of navigational instructions 700. The set of navigational instructions 700 may be communicated by the navigation planner 920, e.g., via a wired or wireless connection.

The example system architecture 900 may include and/or may be communicatively coupled with an exterior vehicle camera 922. The exterior vehicle camera 922 may be oriented to toward the route; that is, the exterior vehicle camera 922 may be oriented toward to road in order to capture image data outside the vehicle 802 that occurs along the route. In various aspect, the exterior vehicle camera 922 may be configured to capture first image data 930 that depicts a first scene associated with the route. For example, the exterior vehicle camera 922 may capture first image data 930 that includes at least a portion of the second road 810, the person 804, the courthouse 806, and/or the car 808.

In various aspects, the first image data 930 may be at least one of a static image, a moving image, a video, a plurality of images, and the like. In various aspects, the first image data 930 may depict the first scene over a plurality of time steps (e.g., quarter seconds, half seconds, seconds, minutes, etc.). For example, the first image data 930 may include a plurality of images captured over a plurality of time steps.

The example system architecture 900 may further include and/or be communicatively coupled with an interior vehicle camera 924. The interior vehicle camera 924 may be oriented toward a user (e.g., a driver of the vehicle 802). The interior vehicle camera 924 may be configured to capture second image data 944. Because the interior vehicle camera 924 is oriented toward the user, the interior vehicle camera 924 may be configured to capture second image data 944 that depicts a gaze of the user, such as a direction of a gaze of the user. Accordingly, a field of view 814 associated with the user may be based on the direction of the gaze of the user, as depicted in the second image data 944.

In various aspects, the second image data 944 may be at least one of a static image, a moving image, a video, a plurality of images, and the like. While the example system architecture 900 illustrates an interior vehicle camera 924, other sensors may be used in order to determine a direction in which the user is gazing. For example, a sensor may be configured to detect an orientation of the user's head, a height of the user's head within the vehicle 802, etc. from which a direction of the user's gaze may be determined.

The example system architecture 900 may further include and/or be communicatively coupled with an object detector 902. The object detector 902 may be configured to identify a set of objects from image data. The object detector 902 may obtain the first image data 930 captured by the exterior vehicle camera 922. Based on the first image data 930, the object detector 902 may detect (e.g., identify) one or more objects disposed along the route that is being navigated. For example, the object detector 902 may detect a set of objects that includes the person 804, the courthouse 806, and/or the car 808.

In one aspect, the object detector 902 may be configured to classify each object of the set of objects 804, 806, 808, 812. For example, the object detector 902 may be configured to classify the person 804 as a person. In another example, the object detector 902 may be configured to classify the courthouse 806 as a building or courthouse. In another example, the object detector 902 may be configured to classify the car 808 as a vehicle or a car.

In an aspect, the object detector 902 may be configured to identify one or more visual attributes of each object of the set of objects 804, 806, 808, 812. For example, the object detector 902 may be configured to detect that the person 804 is of a certain sex (e.g., male or female), to detect that the person 804 has certain hair color (e.g., brown), to detect that the person 804 is wearing certain items of clothing (e.g., blue suit), etc. In another example, the object detector 902 may be configured to detect that the courthouse 806 includes one or more physical features (e.g., several columns), to detect that the courthouse 806 includes a sign 812 (e.g., the scales of justice), to detect that the courthouse 806 has a flag, etc. In another example, the object detector 902 may be configured to detect that the car 808 is a certain type (e.g., car, sport-utility vehicle, van, truck, etc.), to detect that the car 808 is of a certain color (e.g., blue), to detect that the car 808 is of a certain make and/or model (e.g., Mercedes E400), etc.

In various aspects, the object detector 902 may be configured to determine one or more dynamic attributes about one or more of the objects 804, 806, 808, 812. A dynamic attribute may change over time. For example, the first image data 930 may depict the first scene over a plurality of time steps. Over the plurality of time steps, one or more of the person 804 and/or the car 808 may be in motion. The object detector 902 may be configured to determine the motion of the person 804 and/or the car 808. For example, when the car 808 turns right onto the second road 810, the object detector 902 may be configured to determine that the car 808 has turned right onto the second road 810.

In various aspects, the object detector 902 may include or may be communicatively coupled with a DNN and/or other machine-learning model. For example, the object detector 902 may include one or more reinforcement-learning models, a CNN, an RNN, or another object-detection system. In one aspect, the object detector 902 may include one or more neural networks that implement a Single Shot Multibox Detector (SSD) and/or You Only Look Once (YOLO) for object detection (e.g., real-time object detection). In one aspect, object detector 902 may identify each object of the set of objects 804, 806, 808, 812 disposed along the route by processing the first image data 930 using a DNN or other model/neural network.

The object detector 902 may output a set of identified objects 932 that indicates the person 804, the courthouse 806, and/or the car 808. In various aspects, the object detector 902 may output the set of identified objects 932 such that the classifications of one or more of the objects 804, 806, 808, 812 are indicated, the visual attributes of one or more of the objects 804, 806, 808, 812 are indicated, the dynamic attributes of one or more of the objects 804, 808 are indicated, and/or other attributes or information is indicated.

The example system architecture 900 may further include and/or be communicatively coupled with an attention detector 908. The attention detector 908 may obtain the second image data 944 from the interior vehicle camera 924. Based on the second image data 944, the attention detector 908 may be configured to detect a gaze of a user operating the vehicle 802. For example, the attention detector 908 may identify a head of a user and may identify an orientation of the head (e.g., in an azimuthal plane, in an elevational plane, etc.). In another example, the attention detector 908 may identify a part(s) of eye(s) of a user (e.g., iris, pupil, sclera, etc.) and may identify an orientation of the part(s) of the eye(s) (e.g., in an azimuthal plane, in an elevational plane, etc.).

Based on the orientation(s) of the head and/or eye(s) of the user, the attention detector 908 may determine or estimate a second field of view 814 that is associated with the user. For example, the attention detector 908 may determine that the second field of view 814 is includes at least a portion of the environment 800, and the at least the portion may be based on the orientation of the detected gaze of the user. In one aspect, the attention detector 908 may determine an orientation of the user's gaze as a first angle in the azimuthal plane and a second angle in the elevational plane. The attention detector 908 may output field-of-view information 946 indicating a second field of view 814 that is associated with the user.

In one aspect, the attention detector 908 may store the field-of-view information 946. In one aspect, the field-of-view information 946 may be stored before obtaining the set of navigational instructions 700. For example, the attention detector 908 may store field-of-view information 946 that indicates one or more patterns of the user to gaze in a certain orientation. Accordingly, the field-of-view information 946 may be used in future navigations along future routes. In other words, the attention detector 908 does not necessarily determine a second field of view 814 associated with a user for each navigational route; rather, stored field-of-view information from the past may be referenced for other navigational routes.

In various aspects, the attention detector 908 may include or may be communicatively coupled with a DNN and/or other machine-learning model. For example, the attention detector 908 may include one or more reinforcement-learning models, a CNN, an RNN, or another detection system. In one aspect, the attention detector 908 may detect the gaze orientation of the user and/or determine the second field of view 814 that is associated with the user by processing the second image data 944 using a DNN or other model/neural network.

The example system architecture 900 may further include an information store component 904. In various aspects, the information store component 904 may include or may be communicatively coupled with a DNN and/or other machine-learning model. For example, the information store component 904 may include one or more reinforcement-learning models, a CNN, an RNN, or another system.

The information store component 904 may include information associated with a profile of a user of the vehicle 802. In various aspects, the information store component 904 may include profile information indicating an age of the user, a sex of the user, a driving experience level of the user, a preference of the user, and/or a location of the user.

The information store component 904 may obtain profile information associated with a user using one or more of various techniques. For example, the information store component 904 may obtain profile information associated with a user through input from the user. In another example, the information store component 904 may obtain profile information based on the second image data 944. For example, the information store component 904 may determine or estimate an age, sex, experience level, and/or preference associated with the user based on the second image data 944.

The information store component 904 may provide the profile information 942 to a saliency information component 906. Additionally or alternatively, the attention detector 908 may provide field-of-view information 946 associated with the gaze of a user of the vehicle 802 to the saliency information component 906. The saliency information component 906 may include or may be communicatively coupled with a DNN and/or other machine-learning model. The saliency information component 906 may be configured to aggregate saliency information 940 that is associated with the user of the vehicle 802. For example, the saliency information component 906 may aggregate information associated with the field-of-view information 946 and the profile information 942. The saliency information component 906 may provide saliency information 940 to the salient objects selection component 910.

The salient objects selection component 910 may obtain the set of identified objects 932 and the saliency information 940. Based on the set of identified objects 932 and the saliency information 940, the salient objects selection component 910 may be configured to identify at least one salient object represented in the first scene. A salient object may be an object of the set of objects 804, 806, 808, 812 that is estimated to be noticed by the user navigating the route in the vehicle 802. For example, the salient objects selection component 910 may be configured to identify at least one of the object 804, 806, 808 that is estimated to be at least partially in the second field of view 814 that is associated with the user of the vehicle 802.

In various aspects, the salient objects selection component 910 may identify a portion of the first scene depicted in the first image data 930 that corresponds to the field-of-view information 946. For example, the salient objects selection component 910 may select a right portion of the first scene depicted in the first image data 930 when the field-of-view information 946 indicates that the user of the vehicle 802 is gazing to the right. In another example, the salient objects selection component 910 may select a lower portion of the first scene depicted in the first image data 930 when the field-of-view information 946 indicates that the user of the vehicle 802 is gazing downward and/or indicates that the user is sitting relatively low in the driver's seat of vehicle 802. The salient objects selection component 910 may determine that objects depicted in the identified portion of the first scene that corresponds to the field-of-view information 946 are salient to the user of the vehicle 802 and, therefore, are more likely to be noticed by the user as the user is navigating the route.

As described herein, the first image data 930 may depict the first scene over a plurality of times steps. For example, the first image data 930 may depict the first scene over a plurality of time steps in which the car 808 has turned right onto the second road 810. The salient objects selection component 910 may determine that the car 808 is the most salient object, and the motion of the car 808 over the plurality of time steps may influence the saliency of the car 808. In other words, the salient objects selection component 910 may be configured to select salient objects based at least in part on the motion of those salient objects over a plurality of time steps.

In various aspects, the salient objects selection component 910 may determine objects that may be salient to the user of the vehicle 802 based on the profile information 942 that is indicated in the saliency information 940. For example, the salient objects selection component 910 may determine a relative saliency of an object based on at least one of an age associated with the user, a sex associated with the user, a driving experience level associated with the user, a preference associated with the user, historical information associated with the user, a location associated with the user, or other profile information that is associated with the user.

According to one example, the profile information 942 may indicate that the user is associated with a certain demographic, e.g., based on the age associated with the user, sex associated with the user, etc. Due to the certain demographic, the user may be inclined to find some objects more salient than other objects. For example, a user of one demographic may be more inclined to recognize certain signs (e.g., store logos, restaurant signs, etc.) rather than other signs. Illustratively, a first user may be more inclined to recognize a store logo for a youth clothing store, whereas a second user may be more inclined to recognize a restaurant sign for a nationwide restaurant. Accordingly, the salient objects selection component 910 may identify the store logo as a salient object for the first user based on profile information associated with the first user, whereas the salient objects selection component 910 may identify the restaurant sign as a salient object for the second user based on the profile information associated with the second user.

In another example, the profile information 942 may indicate that the user is associated with a certain driving experience level. Due to the driving experience level, the user may be more inclined to fine some objects more salient than others. For example, a relatively inexperienced driver may be more inclined to keep his or her attention directed to the road in front of him or her. Accordingly, the salient objects selection component 910 may identify objects proximate to or disposed on the road (e.g., the car 808) as a salient object to the relatively inexperienced driver.

In another example, the profile information 942 may indicate a preference associated with the user. For example, the user may indicate a preference of signs (e.g., the sign 812) as salient objects, the user may indicate a preference of other vehicles (e.g., the car 808) as salient objects, etc. Accordingly, the salient objects selection component 910 may identify objects as salient based on the preference associated with the user.

In another example, the profile information 942 may indicate historical information associated with the user. For example, the historical information may indicate that the user has found a certain classification of object(s) salient in the past. In another example, the historical information may indicate that the user has frequented a certain type of establishment (e.g., a nationwide restaurant chain, a youth clothing store, etc.) and so may find objects (e.g., signs, logos, etc.) associated with that certain type to be more salient than other objects. Accordingly, the salient objects selection component 910 may identify objects as salient based on the historical information associated with the user.

In another example, the profile information 942 may indicate a location associated with the user in the vehicle 802. Due to the location of the user in the vehicle 802, the user may be more inclined to find some objects more salient than other objects. For example, if the location of the user indicates that the user is familiar with the area (e.g., the location of the user is relatively proximate to a home location of the user), salient objects selection component 910 may be more inclined to recognize local objects (e.g., local landmarks, buildings, stores, etc.). Illustratively, a first user at a location with which he or she is familiar may be more inclined to recognize a local building (e.g., the courthouse 806 having the sign 812), whereas a second user at a location with which he or she is unfamiliar may be more inclined to recognize a restaurant sign for a nationwide restaurant chain, other vehicles disposed along the route (e.g., the car 808), etc. Accordingly, the salient objects selection component 910 may identify the local building as a salient object for the first user based on profile information associated with the first user, whereas the salient objects selection component 910 may identify the restaurant sign as a salient object for the second user based on the profile information associated with the second user.

The salient objects selection component 910 may include and/or may be communicatively coupled with a DNN and/or other machine-learning model. For example, the salient objects selection component 910 may include one or more reinforcement-learning models, a CNN, an RNN, or another system.

The DNN and/or other machine-learning model associated with the salient objects selection component 910 may include a plurality of neurons, which may be at least partially interconnected. The interconnections may be across neurons of a same layer or different layer. In various aspects, the salient objects selection component 910 may include a plurality of layers comprised of neurons, including an input layer, one or more hidden layers, and an output layer. One or more of the neurons may accept one or more inputs, and one or more of the inputs may be influenced by at least one weight. A weight may influence for activation of a neuron, e.g., by adjusting input to an activation function of the neuron.

In various aspects, the salient objects selection component 910 may adjust one or more weights associated with one or more neurons of the associated DNN and/or other machine-learning model. By adjusting the weights, the salient objects selection component 910 may influence the saliency of objects 804, 806, 808, 812 detected in the first scene represented in the first image data 930. In an aspect, the salient objects selection component 910 may adjust the one or more weights based on the field-of-view information 946 indicated in the saliency information 940. In an aspect, the salient objects selection component 910 may adjust the one or more weights based on the profile information 942 indicated in the saliency information 940. Accordingly, the salient objects selection component 910 may influence the activations of neurons based on the field-of-view information 946 associated with the user of the vehicle 802 and/or based on the profile information 942 associated with the user of the vehicle 802.

The salient objects selection component 910 may construct a list of salient objects that is ordered according to relative saliency. For example, the salient objects selection component 910 may order the list from most salient to least salient. In another example, the salient objects selection component 910 may select a single object that is determined to be most salient relative to the other objects. The salient objects selection component 910 may provide salient object information 934 to an alignment component 912. The salient object information 934 may indicate one or more of the objects 804, 806, 808, 812 that are determined to be salient to the user of the vehicle 802.

The alignment component 912 may obtain the salient object information 934 and may align a navigational instruction with at least one salient object indicated by the salient object information. For example, the alignment component 912 may obtain, from the navigation planner 920, at least one navigational instruction 702*a-e* of the set of navigational instructions 700. The alignment component 912 may determine instructional information 936 that describes the first navigational instruction 702*a* with reference to at least one salient object indicated by the salient object information 934. For example, the alignment component 912 may determine instructional information that describes a direction at a distance that the user is to navigate the vehicle 802 by describing the direction at the distance using at least one salient object indicated by the salient object information 934.

Illustratively, the alignment component 912 may obtain navigational instruction information indicating that the first navigational instruction 702*a* includes a right turn in 0.4 miles at Nansen Rd. The alignment component 912 may then align the first navigational instruction 702*a* with one or more objects indicated by the salient object information 934. According to one example, the salient object information 934 may indicate that the user is estimated to have noticed the person 804. The alignment component 912 may determine instructional information that describes the first navigational instruction 702*a* with reference to the person 804. For example, the alignment component 912 may determine the instructional information to describe the first navigational instruction 702*a* as a right turn at the intersection where the person 804 is standing (e.g., "turn right away from the person in the blue suit," "turn right at the intersection with the person in the blue suit standing on the left corner," etc.).

As described herein, the first image data 930 may depict the at least one salient object is in motion. For example, the salient object information 934 may indicate that the car 808 is a salient object that is in motion corresponding to the route (e.g., right on the second road 810). According to one example, the salient object information 934 may indicate that the user is estimated to have noticed the car 808. The alignment component 912 may determine instructional information that describes the first navigational instruction 702*a* with reference to the car 808 and/or with reference to the motion of the car 808. For example, the alignment component 912 may determine the instructional information to describe the first navigational instruction 702*a* as a right turn at the intersection consistent with the motion of the car 808 (e.g., "follow the blue Mercedes right at the intersection," "turn right on Nansen Road where the red car in front of you has turned," etc.).

The alignment component 912 may include and/or may be communicatively coupled with a DNN and/or other machine-learning model. For example, the alignment component 912 may include one or more reinforcement-learning models, a CNN, an RNN, or another system.

The alignment component 912 may output the instructional information 936 describing at least one navigational instruction (e.g., the first navigational instruction 702*a*) with reference to at least one salient object (e.g., the car 808). An object instruction component 914 may obtain the instructional information 936, and the object instruction component 914 may generate an output instruction 938 that indicates the at least one navigational instruction with reference to the at least one salient object. For example, the object instruction component 914 may generate an output instruction 938 for visual presentation on a display (e.g., an on-board computer display of the vehicle 802, a heads-up display (HUD) projected on a windshield of the vehicle 802, a smartphone display, etc.) and/or for audio presentation through a speaker (e.g., a speaker of an audio system of the vehicle 802, a speaker of a smartphone, etc.).

Accordingly, a user interface 926 may provide the output instruction 938 to a user of the vehicle in order to describe at least one navigational instruction with reference to at least one salient object. The user interface 926 may be included in an on-board computer of the vehicle 802. In another aspect, the user interface 926 may be included in a smartphone of a user of the vehicle 802. In another aspect, the user interface 926 may be included in a same system as the navigation planner 920. In one aspect, the object instruction component 914 may provide the output instruction 938 to the user interface 926 over a connection (e.g., wired or wireless network, computer-bus connection, etc.).

In the description provided herein, reference is made to a DNN and/or other machine-learning model. One or more of the aforementioned DNNs and/or other machine-learning models may be a same DNN and/or machine-learning model. However, the present disclosure all comprehends a plurality of DNNs and/or other machine-learning models. For example, the object detector 902 may include and/or may be communicatively coupled with a first DNN and/or machine-learning model, whereas the salient objects selection component 910 may include and/or may be communicatively coupled with a different DNN and/or machine-learning model. In another example, the salient objects selection component 910 and the alignment component 912 may include and/or may be communicatively coupled with a same DNN and/or machine-learning model.

Figure 10:
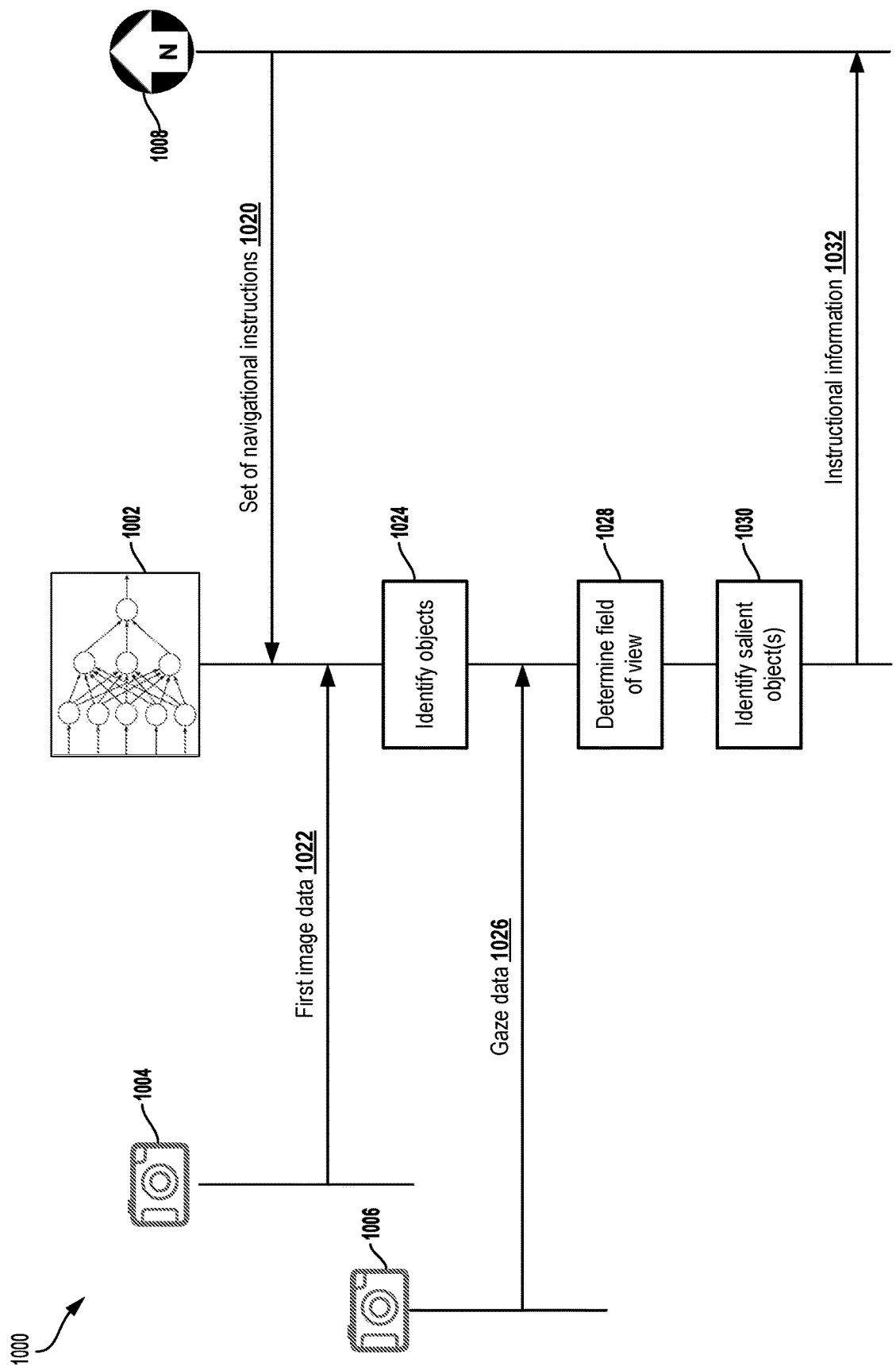
FIG. 10 is a call flow diagram illustrating a method for providing object-based navigational instructions, in accordance with aspects of the present disclosure.

FIG. 10 is a call flow diagram illustrating a method 1000 for operating at least one neural network 1002. The at least one neural network 1002 may include one or more DNNs and/or other machine-learning models. The at least one neural network 1002 may be an aspect of one or more components 902, 904, 906, 908, 910, 912, 914, and/or 920 described with respect to the example system architecture 900 of FIG. 9.

In an aspect, the at least one neural network 1002 may obtain a set of navigational instructions 1020 describing a route to a destination from a navigational system 1008 (e.g., GPS or other map-based navigational system and/or software). In the context of FIG. 7, the at least one neural network 1002 may obtain the set of navigational instructions 700.

In an aspect, a first image capture device 1004 (e.g., a first camera) may be oriented toward the route that the vehicle is navigating toward the destination. The first image capture device 1004 may capture first image data 1022 that depicts a first scene associated with the route. In the context of FIG. 8, the first image capture device 1004 may capture at least a portion of the environment 800.

The at least one neural network 1002 may obtain, from the first image capture device 1004, the first image data 1022 that depicts the first scene associated with the route. The at least one neural network 1002 may identify 1024 one or more objects that are represented in the first scene. For example, the at least one neural network 1002 may process the first image data 1022 using a first DNN and/or other machine-learning model for identification of a set of objects represented in the first scene. In the context of FIG. 8, the at least one neural network 1002 may identify the person 804, the courthouse 806, the sign 812, and/or the car 808.

In an aspect, a first sensor 1006 (e.g., a second image capture device, a second camera, etc.) may capture gaze data 1026 (e.g., gaze data or other information indicating a gaze of a user of a vehicle). For example, a second image capture device may capture image data indicating an orientation of a user's head and/or gaze (e.g., in an azimuthal and/or elevational plane). In the context of FIG. 8, the first sensor 1006 may capture gaze data 1026 indicating a gaze of a user (e.g., driver) the vehicle 802.

The at least one neural network 1002 may obtain the gaze data 1026 captured by the first sensor 1006. The at least one neural network 1002 may determine 1028 field-of-view information associated with the user. For example, the at least one neural network 1002 may determine an angle of azimuth and/or an angle of elevation, and the at least one neural network 1002 may estimate a field of view that is associated with the user of the vehicle based on the azimuthal angle and/or elevational angle. In one aspect, the at least one neural network 1002 may processing the first image data 1022 using a second DNN and/or other machine-learning model for determination of the field-of-view information. For example, the at least one neural network 1002 may process the gaze data 1026 for identification of a field of view of the user, e.g., based on an orientation of the user's head and/or eyes. In the context of FIG. 8, the at least one neural network 1002 may determine 1028 field-of-view information associated with the second field of view 814 of the user of the vehicle 802.

Based on the field-of-view information, the at least one neural network 1002 may identify 1030 one or more salient object represented in the first scene that is depicted in the first image data 1022. For example, the at least one neural network 1002 may identify at least a portion of the first scene that is estimated to be within a field of view of the user. The at least one neural network 1002 may then identify one or more salient objects represented in the first scene. In one aspect, the at least one neural network 1002 may identify one or more salient objects that are estimated to be near a center of the user's field of view. In another aspect, the at least one neural network 1002 may identify one or more salient objects near a next navigational instruction (e.g., next turn) that are estimated to be within the user's field of view. In the context of FIGS. 7-8, the at least one neural network 1002 may identify 1030 the car 808 as a salient object, e.g., because the car 808 is estimated to be at least partially within the user's field of view and/or is near a first navigational instruction 702a.

In one aspect, the at least one neural network 1002 may be configured to determine that at least one object is in motion over a plurality of time steps, e.g., when the first image data 1022 depicts the first scene over a plurality of time steps. The at least one neural network 1002 may be configured to determine the motion of the at least one salient object. In an aspect, the at least one neural network 1002 may be configured to identify the at least one object as salient based on the motion of the at least one object over the plurality of time steps.

In one aspect, the at least one neural network 1002 may identify 1030 the one or more salient objects from the set of objects identified in the first scene by processing the field-of-view information and the set of objects identified in the first scene using a third DNN and/or other machine-learning model. For example, the field-of-view information and information indicating the set of objects may be provided to an input layer of a DNN. One or more neurons of the input layer may be communicatively coupled with one or more hidden layers of the DNN, and at least one neuron of the hidden layer may be communicatively coupled with at least one neuron of an output layer of the DNN. Inputs provided to neurons (e.g., at the hidden layer, at the one or more hidden layers, at the output layer) may be influenced by a respective weight. The respective weights may be the same or different across neurons of the same layer and/or neurons of different layers. In various aspects, the weights may be configured for and/or by the at least one neural network 1002 through reinforcement learning or another machine-learning technique.

In one aspect, the weights may be configured for and/or by the at least one neural network 1002 based on the field-of-view information. For example, one or more weights may be adjusted in order to influence the relative saliency of each object of the set of objects. In one example, the adjustment of the weights may cause one or more objects that are estimated to be relatively closer to the center of a user's field of view to be relatively more salient than other objects.

In one aspect, the weights may be configured for and/or by the at least one neural network 1002. In an aspect, one or more weights may be configured based at least in part on a profile associated with a user. The profile may be based on at least one of an age of the user, a sex of the user, a driving experience level of the user, a preference of the user, historical information associated with the user, and/or a location of the user.

After identifying the one or more salient objects, the at least one neural network 1002 may determine instructional information 1032 that describes a first navigational instruction of the set of navigational instructions with reference to the one or more salient objects. For example, the at least one neural network 1002 may generate instructional information 1032 that indicates a distance and/or direction of travel in the context of the one or more identified salient objects. In one aspect, the at least one neural network 1002 may output the instructional information 1032 in order to be output through one of audio and/or visual presentation. In the context of FIGS. 7-8, the at least one neural network 1002 may output instructional information 1032 in order to be output to a user of the vehicle 802, and the instructional information may describe the first navigational instruction 702a with reference to at least one of the objects 804, 806, 808, 812 (e.g., the car 808).

In one aspect, the at least one neural network 1002 may be configured to determine the instructional information 1032 describing the first navigational instruction with reference to the motion of the at least one salient object over a plurality of time steps. For example, the at least one neural network 1002 may be configured to determine that the motion of the at least one salient object corresponds to a first navigational instruction (e.g., a vehicle has turned right onto a road that is consistent with the turn and/or road indicated by the first navigational instruction). The at least one neural network 1002 may determine the instructional information 1032 to indicate the motion of the at least one salient object. Accordingly, the at least one neural network 1002 may determine the instructional information 1032 based on the motion of the at least one salient object. In the context of FIGS. 7-8, the at least one neural network 1002 may identify the car 808 turning right onto the second road 810 is a salient object, and the at least one neural network 1002 may determine the instructional information 1032 describing the first navigational instruction 702a with reference to the right turn onto the second road 810 by the car 808 (e.g., "follow the car right at the upcoming intersection").

Figure 11A:
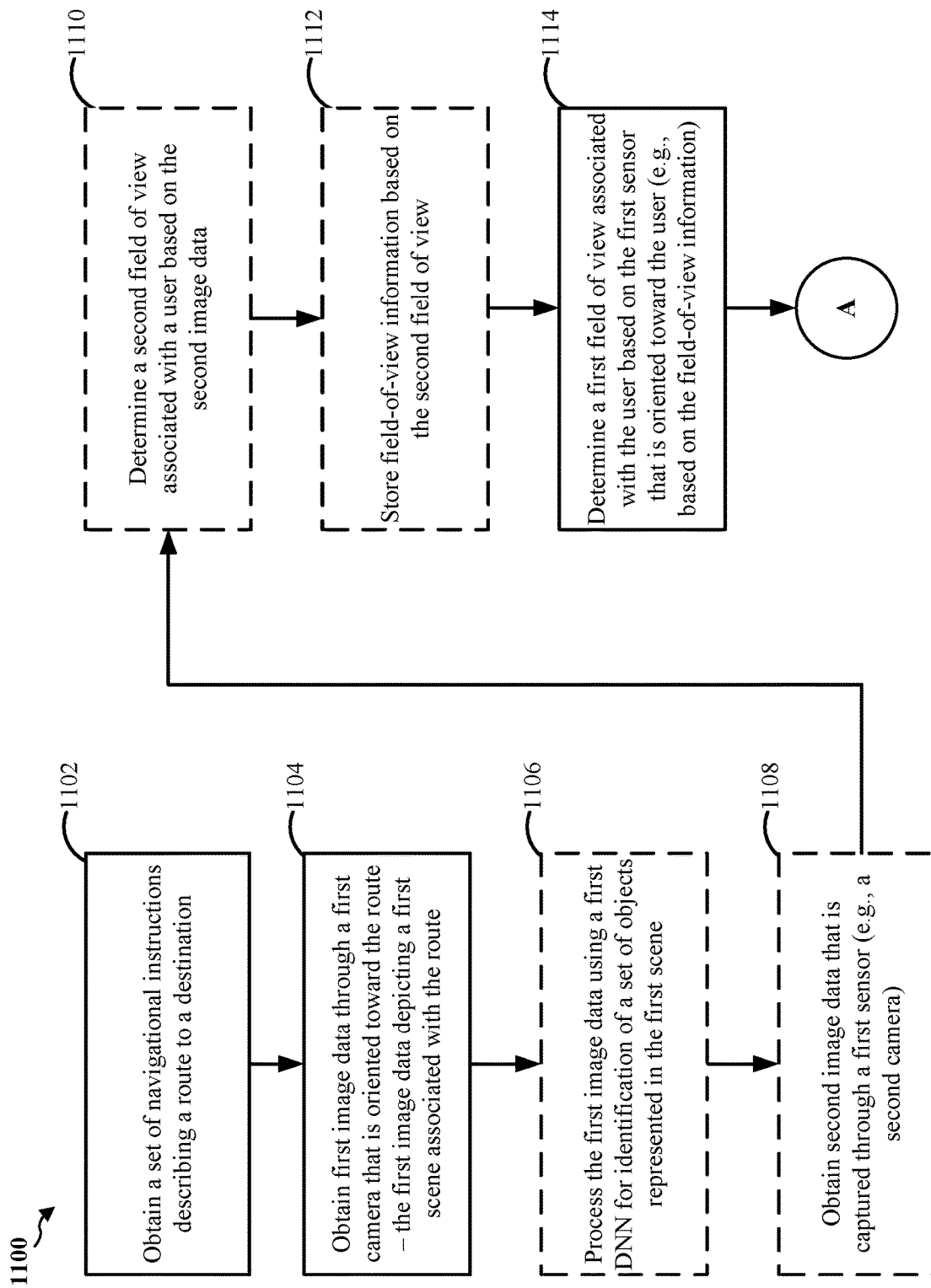
FIGS. 11A and 11B are a flowchart illustrating a method for providing object-based navigational instructions, in accordance with aspects of the present disclosure.
Figure 11B:
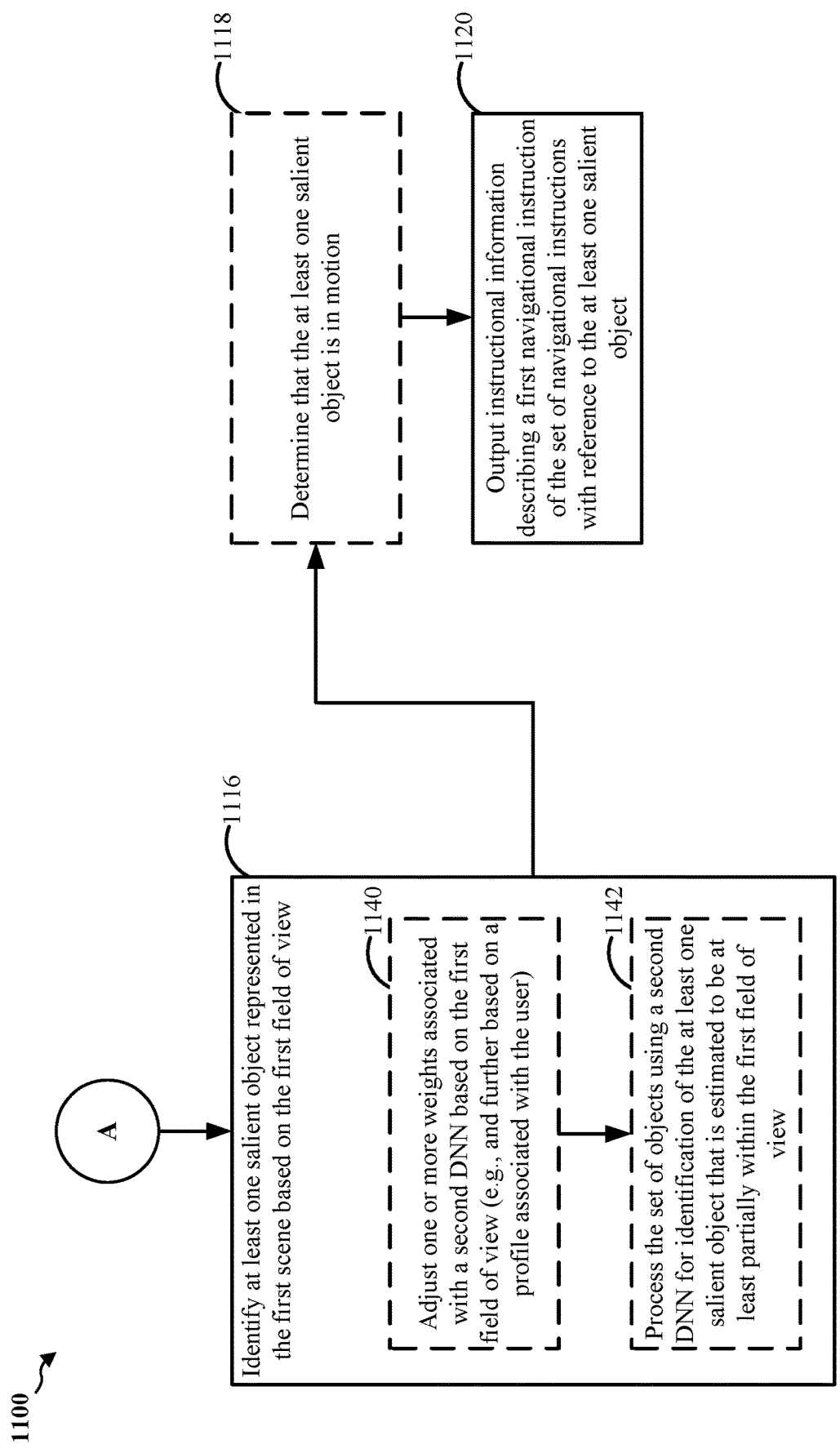

FIGS. 11A and 11B illustrate a method 1100 for determining navigational instructions with reference to at least one salient object, in accordance with various aspects of the present disclosure. The method may be practiced in one or more neural networks and/or other-machine-learning models, such as the vehicle 802 of FIG. 8, the example system architecture 900 of FIG. 9, and/or the at least one neural network 1002 of FIG. 10. One or more of the illustrated operations may be transposed, omitted, and/or contemporaneously performed. Operations illustrated with dashed lines may be optional.

Beginning with operation 1102, at least one neural network may obtain a set of navigational instructions describing a route to a destination. For example, the at least one neural network may communicate with a navigation system in order to obtain the set of navigational instructions, and the at least one neural network may identify one or more navigational instructions included in the set. In aspects, the at least one neural network may identify one or more portions of a first navigational instruction of the set of navigational instructions, such as a first portion indicating a next direction to be navigated (e.g., left, right, straight, etc.), a second portion indicating a distance to the next direction (e.g., 400 feet, 0.5 miles, etc.), and/or a third portion indicating an identifier of a road (e.g., street name, highway number, etc.).

In the context of FIGS. 7-9, the navigation planner 920 may provide a set of navigational instructions 700 describing a route to a destination through the environment 800 to an alignment component 912. In the context of FIG. 10, the at least one neural network 1002 may obtain, from the navigational system 1008, a set of navigational instructions 1020.

At operation 1104, the at least one neural network may obtain first image data through a first camera that is oriented toward the route. In an aspect, the first image data may depict a first scene associated with the route. For example, the at least one neural network may request first image data from a first camera that is oriented away from a vehicle and toward the route (e.g., road). The at least one neural network may obtain the first image data (e.g., based on the request), and the at least one neural network may store the first image data.

In the context of FIGS. 7-9, the exterior vehicle camera 922 may capture first image data 930 of the environment 800. The object detector 902 may obtain the first image data 930 from the exterior vehicle camera 922. In the context of FIG. 10, the at least one neural network 1002 may obtain, from the first image capture device 1004 that is oriented toward the route, the first image data 1022 that depicts the first scene associated with the route.

At operation 1106, the at least one neural network may process the first image data using a first DNN for identification of a set of objects represented in the first scene. For example, the at least one neural network may provide the first image data to an input layer of a first DNN (e.g., a CNN). The first DNN may detect one or more objects depicted in the first scene, and may identify (e.g., classify) the one or more objects. An output layer of the first DNN may provide information indicating a set of objects depicted in the first scene that is identified by the first DNN.

In the context of FIGS. 7-9, the object detector 902 may process the first image data 930 depicting at least a portion of the environment 800. The object detector 902 may identify at least one of the set of objects 804, 806, 808, 812. For example, the object detector 902 may identify the person 804, the courthouse, the car 808, and/or the sign 812. The object detector 902 may output a set of identified objects 932. In the context of FIG. 10, the at least one neural network 1002 may identify 1024 one or more objects represented in the first scene depicted by the first image data 1022.

At operation 1108, the at least one neural network may obtain second image data through a first sensor (e.g., a second camera, an image capture device, etc.) that is oriented toward a user. For example, the at least one neural network may request gaze data (e.g., second image data) from a first sensor that is oriented toward a user (e.g., a driver of a vehicle). The at least one neural network may obtain the gaze data (e.g., based on the request), and the at least one neural network may store the gaze data.

In the context of FIGS. 7-9, the attention detector 908 may obtain, from the interior vehicle camera 924, the second image data 944. The second image data 944 may be associated with a field of view 814 associated with a driver of the vehicle 802. In the context of FIG. 10, the at least one neural network 1002 may obtain, from the first sensor 1006, the gaze data 1026.

At operation 1110, the at least one neural network may determine a second field of view associated with the user based on the second image data. For example, the at least one neural network may determine an orientation of the user's head and/or eyes. In one aspect, the at least one neural network may measure an azimuthal angle and/or may measure an elevational angle of the user's head and/or eyes. Based on the orientation (e.g., measured angles of azimuth and elevation), the at least one neural network may estimate a second field of view that is associated with the user.

In the context of FIGS. 7-9, the attention detector 908 may determine a second field of view (e.g., the field of view 814) that is associated with a user of the vehicle 802 based on the second image data 944. In the context of FIG. 10, the at least one neural network 1002 may determine a second field of view, e.g., based on the gaze data 1026 obtained from the first sensor 1006.

At operation 1112, the at least one neural network may store field-of-view information based on the second field of view. For example, the at least one neural network may provide a data structure that includes the field-of-view information to a memory, and the at least one neural network may cause (e.g., instruct) the memory to store the data structure that includes the field-of-view information. In one aspect, the at least one neural network may store the field-of-view information before obtaining the set of navigational instructions (operation 1102). Accordingly, the field-of-view information may be used for future and/or a plurality of navigations along one or more routes.

In the context of FIGS. 7-9, the attention detector 908 may store field-of-view information 946. For example, the attention detector 908 may cause the information store component 904 to store the field-of-view information. In the context of FIG. 10, the at least one neural network 1002 may store field-of-view information, e.g., based on gaze data 1026 obtained from the first sensor 1006.

At operation 1114, the at least one neural network may determine a first field of view associated with the user that is navigating the route to the destination. In an aspect, the at least one neural network may determine the first field of view based on a first sensor that is oriented toward the user (e.g., based on gaze data that is obtained from the first sensor). In one aspect, the at least one neural network may determine the first field of view associated with the user by accessing stored field-of-view information (e.g., that was obtained from the first sensor), and identifying the first field of view based on the accessed field-of-view information.

In one aspect, the at least one neural network may estimate the first field of view based on an orientation of the user's gaze (e.g., orientation of the user's head and/or eyes). The at least one neural network may estimate the orientation based on azimuthal angle and/or based on an elevational angle that is indicated by gaze data obtained from the first sensor and/or based on store field-of-view information. The at least one neural network may identify at least a portion of the first scene depicted in the image data that corresponds to the first field of view. For example, if the at least one neural network estimates that the orientation of the user's gaze is relatively elevated and relatively to the right, the at least one neural network may estimate that the at least the portion of the first scene corresponds to a relatively elevated (e.g., relatively higher) portion of the first scene and/or corresponds to a relatively right portion of the first scene. In one aspect, the at least the portion may be a fractional section (e.g., quadrant, etc.). The at least one neural network may determine that the at least the portion corresponds to the first field of view associated with the user and, accordingly, at least one salient object may be estimated to be within the at least the portion of the first scene.

In the context of FIGS. 7-9, the attention detector 908 may determine a field of view 814 that is associated with a user of the vehicle 802. The attention detector 908 may provide field-of-view information 946 to the saliency information component 906. The saliency information component 906 may provide saliency information 940 to the salient objects selection component 910. The salient objects selection component 910 may further obtain the set of identified objects 932 from the object detector 902, which may include at least a portion of the first image data 930. The salient objects selection component 910 may identify a portion of the first scene depicted in the first image data 930 that corresponds to the field-of-view information 946.

In the context of FIG. 10, the at least one neural network 1002 may determine 1028 a field of view associated with a user. For example, the at least one neural network 1002 may identify at least a portion of the scene that corresponds to the first scene depicted in the first image data 1022, e.g., based on a gaze of the user indicated by the gaze data 1026.

Continuing to operation 1116 of FIG. 11B, the at least one neural network may identify at least one salient object represented in the first scene. The at least one neural network may identify the at least one salient object based on the first field of view associated with the user. For example, the at least one neural network may determine one or more objects of the set of identified objects, and the at least one neural network may select at least one salient object that is estimated to be at least partially within the user's field of view. In the context of FIGS. 7-9, the salient objects selection component 910 may identify at least one salient object (e.g., the car 808) based on the set of identified objects 932, which may indicate the person 804, the courthouse 806, the car 808, and/or the sign 812. In the context of FIG. 10, the at least one neural network 1002 may identify 1030 at least one salient object based on the determination 1028 of the user's field of view and based on the identification 1024 of the set of objects depicted in the first scene represented in the first image data 1022.

In one aspect, operation 1116 may include operation 1140 and operation 1142. At operation 1140, the at least one neural network may adjust one or more weights associated with a second DNN. The at least one neural network may adjust the one or more weights associated with the second DNN based on the first field of view. In one aspect, the at least one neural network may adjust the one or more weights based at least in part on a profile that is associated with the user. The profile may be based on, for example, at least one of an age associated with the user, a sex associated with the user, a driving experience level associated with the user, a preference associated with the user, historical information associated with the user, and/or a location associated with the user.

In the context of FIGS. 7-9, the salient objects selection component 910 may set and/or may have set one or more weights based on the saliency information 940. For example, the salient objects selection component 910 may set one or more weights based on the field-of-view information 946 and/or the profile information 942, which may be indicated in the saliency information 940. In the context of FIG. 10, the at least one neural network 1002 may set and/or may have set one or more weights based on the determination 1030 of the user's field of view (e.g., based on the gaze data 1026) and/or based on stored profile information that is associated with the user.

At operation 1142, the at least one neural network may process the set of objects using a second DNN for identification of the at least one salient object that is estimated to be at least partially within the first field of view. For example, the at least one neural network may provide the set of identified objects to one or more neurons of an input layer of the second DNN. The set of identified objects may cause activation of one or more neurons of one or more layers of the second DNN. In various aspects, a respective weight of the weights may be connected to a neuron and may influence activation of that neuron. The at least one neural network may obtain an output, from an output layer of the second DNN, that indicates at least one salient object that is estimated to be at least partially within the user's field of view.

In the context of FIGS. 7-9, the salient objects selection component 910 may provide the set of identified objects 932 to a second DNN. The second DNN may process the set of identified objects 932 in order to identify at least one salient object (e.g., the car 808) that is estimated to be at least partially within the field of view 814 of the user of the vehicle 802. In the context of FIG. 10, the at least one neural network 1002 may process the set of identified objects using a second DNN in order to identify 1030 that at least one salient object that is estimated to be at least partially within the user's field of view.

At operation 1118, the at least one neural network may determine that the at least one salient object is in motion over a plurality of time steps. For example, the at least one neural network may compare time steps of the first image data in which the at least one salient object is represented, and the at least one neural network may determine that the at least one salient object is in motion when the at least one salient object is differently positioned over different time steps of the first image data. In the context of FIGS. 7-9, the salient objects selection component 910 may determine that the car 808 is a salient object, and the salient objects selection component 910 may determine that the car is in motion over a plurality of time steps captured in the first image data 930. In the context of FIG. 10, the at least one neural network 1002 may determine that the at least one salient object is in motion over a plurality of time steps represented in the first image data 1022.

At operation 1120, the at least one neural network may output instructional information that describes a first navigational instruction of the set of navigational instructions with reference to the at least one salient object. For example, the at least one neural network may generate instructional information that indicates a distance and/or direction of travel in the context of the at least one salient object. In one aspect, the at least one neural network may output the instructional information in order to be output through one of audio and/or visual presentation. Accordingly, the at least one neural network may facilitate provision to the user of the first navigational instruction with reference to at least one object that the user is estimated to find salient.

In one aspect, the at least one neural network may be configured to determine the instructional information describing the first navigational instruction with reference to the motion of the at least one salient object over a plurality of time steps. For example, the at least one neural network may be configured to determine that the motion of the at least one salient object corresponds to the first navigational instruction (e.g., a vehicle has turned right onto a road that is consistent with the turn and/or road indicated by the first navigational instruction). The at least one neural network may determine the instructional information to indicate the motion of the at least one salient object. Accordingly, the at least one neural network may output the instructional information based on the motion of the at least one salient object.

In the context of FIGS. 7-9, the alignment component 912 may obtain the salient object information, e.g., from the salient objects selection component 910. The alignment component 912 may obtain a first navigational instruction 702a from the navigation planner 920. The alignment component 912 may determine instructional information 936 that describes the first navigational instruction 702a with reference to at least one salient object (e.g., the car 808). In one aspect, the alignment component 912 may determine the instructional information 936 describing the first navigational instruction 702*a* with reference to the motion of the at least one salient object over a plurality of time steps (e.g., the motion of the car 808 as the car 808 turns right on the second road 810). The alignment component 912 may provide the instructional information 936 to an object instruction component 914, and the object instruction component 914 may generate an output instruction 938 that describes the first navigational instruction 702*a* with reference to the at least one salient object (e.g., the car 808). The object instruction component 914 may provide the output instruction 938 to a user interface 926 so that the output instruction 938 may be provided to the user through at least one of audio presentation and/or visual presentation.

In the context of FIG. 10, the at least one neural network 1002 may output instructional information 1032 in order to be output to a user, and the instructional information 1032 may describe a first navigational instruction of the set of navigational instructions 1020 with reference to at least salient object.

Accordingly, at least one neural network may be configured to provide navigational instruction information to a user by identifying a salient object and describing a navigational instruction with reference to the salient object.

In one configuration, at least one neural network and/or machine-learning model may be configured to obtain a set of navigational instructions describing a route to a destination. The at least one neural network and/or machine-learning model may be configured to obtain first image data through a first camera that is oriented toward the route, the first image data depicting a first scene associated with the route. The at least one neural network and/or machine-learning model may be configured to determine a first field of view associated with a user that is navigating the route to the destination based on a first sensor that is oriented toward the user. The at least one neural network and/or machine-learning model may be configured to identify at least one salient object represented in the first scene based on the first field of view. The at least one neural network and/or machine-learning model to output instructional information describing a first navigational instruction of the set of navigational instructions with reference to the at least one salient object.

The at least one neural network and/or machine-learning model may include means for obtaining a set of navigational instructions describing a route to a destination. In one aspect, the means for obtaining a set of navigational instructions describing a route to a destination may be the general-purpose processor 102, program memory associated with the general-purpose processor 102, memory block 118, local processing units 202, and or the routing connection processing units 216 configured to perform the functions recited. In one aspect, the means for obtaining a set of navigational instructions describing a route to a destination may include the alignment component 912 and/or the navigation planner 920. In another aspect, the means for obtaining a set of navigational instructions describing a route to a destination may be any component, any module, and/or any apparatus configured to perform the functions recited by the aforementioned means.

The at least one neural network and/or machine-learning model may include means for obtaining first image data through a first camera that is oriented toward the route. In one aspect, the means for obtaining first image data through a first camera that is oriented toward the route may be the general-purpose processor 102, program memory associated with the general-purpose processor 102, memory block 118, local processing units 202, and or the routing connection processing units 216 configured to perform the functions recited. In one aspect, the means for obtaining first image data through a first camera that is oriented toward the route may include the attention detector 908 and/or the interior vehicle camera 924. In another aspect, the means for obtaining a set of navigational instructions describing a route to a destination may be any component, any module, and/or any apparatus configured to perform the functions recited by the aforementioned means.

The at least one neural network and/or machine-learning model may include means for determining a first field of view associated with a user that is navigating the route to the destination based on a first sensor that is oriented toward the user. In one aspect, the means for determining a first field of view associated with a user that is navigating the route to the destination based on a first sensor that is oriented toward the user may be the general-purpose processor 102, program memory associated with the general-purpose processor 102, memory block 118, local processing units 202, and or the routing connection processing units 216 configured to perform the functions recited. In one aspect, the means for determining a first field of view associated with a user that is navigating the route to the destination based on a first sensor that is oriented toward the user may include the interior vehicle camera 924, the attention detector 908, and/or the saliency information component 906. In another aspect, the means for determining a first field of view associated with a user that is navigating the route to the destination based on a first sensor that is oriented toward the user may be any component, any module, or any apparatus configured to perform the functions recited by the aforementioned means.

The at least one neural network and/or machine-learning model may include means for identifying at least one salient object represented in the first scene based on the first field of view. In one aspect, the means for identifying at least one salient object represented in the first scene based on the first field of view may be the general-purpose processor 102, program memory associated with the general-purpose processor 102, memory block 118, local processing units 202, and or the routing connection processing units 216 configured to perform the functions recited. In one aspect, the means for identifying at least one salient object represented in the first scene based on the first field of view may include the object detector 902 and/or the salient objects selection component 910. In another aspect, the means for identifying at least one salient object represented in the first scene based on the first field of view may be any component, any module, or any apparatus configured to perform the functions recited by the aforementioned means.

The at least one neural network and/or machine-learning model may include means for outputting instructional information describing a first navigational instruction of the set of navigational instructions with reference to the at least one salient object. In one aspect, the means for outputting instructional information describing a first navigational instruction of the set of navigational instructions with reference to the at least one salient object may be the general-purpose processor 102, program memory associated with the general-purpose processor 102, memory block 118, local processing units 202, and or the routing connection processing units 216 configured to perform the functions recited. In one aspect, the means for outputting instructional information describing a first navigational instruction of the set of navigational instructions with reference to the at least one salient object may include the alignment component 912, the object instruction component 914, and/or the user interface 926. In another aspect, the means for outputting instructional information describing a first navigational instruction of the set of navigational instructions with reference to the at least one salient object may be any component, any module, or any apparatus configured to perform the functions recited by the aforementioned means.

The at least one neural network and/or machine-learning model may further include means for obtaining second image data that is captured through the second camera. In one aspect, the means for obtaining second image data that is captured through the second camera may be the general-purpose processor 102, program memory associated with the general-purpose processor 102, memory block 118, local processing units 202, and or the routing connection processing units 216 configured to perform the functions recited. In one aspect, the means for obtaining second image data that is captured through the second camera may include the attention detector 908, the information store component 904, the saliency information component 906, and/or the interior vehicle camera 924. In another aspect, the means for obtaining second image data that is captured through the second camera may be any component, any module, or any apparatus configured to perform the functions recited by the aforementioned means.

The at least one neural network and/or machine-learning model may further include means for determining a second field of view associated with the user based on the second image data. In one aspect, the means for determining a second field of view associated with the user based on the second image data may be the general-purpose processor 102, program memory associated with the general-purpose processor 102, memory block 118, local processing units 202, and or the routing connection processing units 216 configured to perform the functions recited. In one aspect, the means for determining a second field of view associated with the user based on the second image data may include the attention detector 908, the information store component 904, the saliency information component 906, and/or the salient objects selection component 910. In another aspect, the means for obtaining second image data that is captured through the second camera may be any component, any module, or any apparatus configured to perform the functions recited by the aforementioned means.

The at least one neural network and/or machine-learning model may further include means for storing field-of-view information based on the second field of view. In one aspect, the means for storing field-of-view information based on the second field of view may be the general-purpose processor 102, program memory associated with the general-purpose processor 102, memory block 118, local processing units 202, and or the routing connection processing units 216 configured to perform the functions recited. In one aspect, the means for storing field-of-view information based on the second field of view may include the attention detector 908, the information store component 904, the saliency information component 906, and/or the salient objects selection component 910. In another aspect, the means for storing field-of-view information based on the second field of view may be any component, any module, or any apparatus configured to perform the functions recited by the aforementioned means.

The at least one neural network and/or machine-learning model may further include means for processing the first image data using a first DNN for identification of a set of objects represented in the first scene. In one aspect, the means for processing the first image data using a first DNN for identification of a set of objects represented in the first scene may be the general-purpose processor 102, program memory associated with the general-purpose processor 102, memory block 118, local processing units 202, and or the routing connection processing units 216 configured to perform the functions recited. In one aspect, the means for processing the first image data using a first DNN for identification of a set of objects represented in the first scene may include the object detector 902 and/or the salient objects selection component 910. In another aspect, the means for processing the first image data using a first DNN for identification of a set of objects represented in the first scene may be any component, any module, or any apparatus configured to perform the functions recited by the aforementioned means.

The at least one neural network and/or machine-learning model may further include means for processing the set of objects using a second DNN for identification of the at least one salient object that is estimated to be at least partially within the first field of view. In one aspect, the means for processing the set of objects using a second DNN for identification of the at least one salient object that is estimated to be at least partially within the first field of view may be the general-purpose processor 102, program memory associated with the general-purpose processor 102, memory block 118, local processing units 202, and or the routing connection processing units 216 configured to perform the functions recited. In one aspect, the means for processing the set of objects using a second DNN for identification of the at least one salient object that is estimated to be at least partially within the first field of view may include the salient objects selection component 910. In another aspect, the means for processing the set of objects using a second DNN for identification of the at least one salient object that is estimated to be at least partially within the first field of view may be any component, any module, or any apparatus configured to perform the functions recited by the aforementioned means.

The at least one neural network and/or machine-learning model may further include means for adjusting one or more weights associated with the second DNN based on the first field of view. In one aspect, the means for adjusting one or more weights associated with the second DNN based on the first field of view may be the general-purpose processor 102, program memory associated with the general-purpose processor 102, memory block 118, local processing units 202, and or the routing connection processing units 216 configured to perform the functions recited. In one aspect, the means for adjusting one or more weights associated with the second DNN based on the first field of view may include the saliency information component 906 and/or the salient objects selection component 910. In another aspect, the means for adjusting one or more weights associated with the second DNN based on the first field of view may be any component, any module, or any apparatus configured to perform the functions recited by the aforementioned means.

The at least one neural network and/or machine-learning model may further include means for determining the at least one salient object is in motion. In one aspect, the means determining the at least one salient object is in motion may be the general-purpose processor 102, program memory associated with the general-purpose processor 102, memory block 118, local processing units 202, and or the routing connection processing units 216 configured to perform the functions recited. In one aspect, the means for determining the at least one salient object is in motion may include the object detector 902, the salient objects selection component 910, and/or the alignment component 912. In another aspect, the means for determining the at least one salient object is in motion may be any component, any module, or any apparatus configured to perform the functions recited by the aforementioned means.

According to certain aspects of the present disclosure, each local processing unit 202 may be configured to determine parameters of the model based upon desired one or more functional features of the model, and develop the one or more functional features towards the desired functional features as the determined parameters are further adapted, tuned and updated.

In some aspects, the method 1000 (FIG. 10) and/or the method 1100 (FIG. 11) may be performed by the SOC 100 (FIG. 1) or the system 200 (FIG. 2). That is, each of the elements of methods 1000 and 1100 may, for example, but without limitation, be performed by the SOC 100 or the system 200 or one or more processors (e.g., CPU 102 and local processing unit 202) and/or other components included therein.

The various operations of methods described above may be performed by any suitable means capable of performing the corresponding functions. The means may include various hardware and/or software component(s) and/or module (s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may include a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein include one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may include a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may include packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may include one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may include a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may include non-transitory computer-readable media (e.g., tangible media). In addition, for other aspects computer-readable media may include transitory computer-readable media (e.g., a signal). Combinations of the above should also be included within the scope of computer-readable media.

Thus, certain aspects may include a computer program product for performing the operations presented herein. For example, such a computer program product may include a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for providing navigational instructions using at least one artificial neural network, the method comprising:
   obtaining, at one or more processors, a set of navigational instructions describing a route to a destination;
   obtaining, at the one or more processors, first image data through a first camera that is oriented toward the route, the first image data depicting a first scene associated with the route;
   obtaining, at the one or more processors, second image data captured through a second camera oriented toward a user that is navigating the route to the destination;
   storing, at a memory, field-of-view information including at least one angle associated with an orientation of the head of the user, wherein the at least one angle comprises at least one of an azimuthal angle or an elevational angle;
   determining, at the one or more processors, a first field of view associated with the user based on a gaze of the user in the second image data determined using the at least one artificial neural network, wherein the first field of view is based on the field-of-view information;

identifying, at the one or more processors, at least one salient object represented in the first scene based on the first field of view;

outputting, at a display or a speaker, instructional information identifying the at least one salient object and describing a first navigational instruction of the set of navigational instructions with reference to the at least one salient object, wherein the first navigational instruction indicates at least one of a distance or a direction of travel with reference to the at least one salient object;

reconfiguring, at the one or more processors, based on the first scene, at least one or more settings of a microphone, the first camera, the second camera, the display, or the speaker.

2. The method of claim 1, further comprising: determining, at the one or more processors, the gaze of the user by processing the second image data using a deep neural network (DNN) implemented by the at least one artificial neural network.

3. The method of claim 1, wherein the storing the field-of-view information comprises: storing, at the memory, the field-of-view information before the obtaining the set of navigational instructions describing the route to the destination.

4. The method of claim 1, further comprising: processing, at the one or more processors, the first image data using a first deep neural network (DNN) implemented by the at least one artificial neural network for identification of a set of objects represented in the first scene, wherein the identifying the at least one salient object represented in the first scene based on the first field of view is further based on the set of objects represented in the first scene.

5. The method of claim 4, wherein the identifying the at least one salient object represented in the first scene based on the first field of view comprises: processing, at the one or more processors, the set of objects using a second DNN implemented by the at least one artificial neural network for identification of the at least one salient object that is estimated to be at least partially within the first field of view.

6. The method of claim 5, further comprising: adjusting, at the one or more processors, one or more weights associated with the second DNN based on the first field of view to influence a saliency of the at least one salient object.

7. The method of claim 6, wherein the one or more weights are adjusted based at least in part on a profile associated with the user, the profile being based on at least one of an age associated with the user, a sex associated with the user, a driving experience level associated with the user, a preference associated with the user, historical information associated with the user, or a location associated with the user.

8. The method of claim 1, wherein the first image data depicts the first scene over a plurality of time steps, and the at least one salient object is in motion over the plurality of time steps.

9. The method of claim 8, further comprising: determining, at the one or more processors, the at least one salient object is in motion, wherein the instructional information describing the first navigational instruction of the set of navigational instructions with reference to the at least one salient object is based on the motion of the at least one salient object.

10. A vehicle for providing navigational instructions using at least one artificial neural network, the vehicle comprising:
a first camera;
a second camera;
at least one of a display or a speaker;
a navigation planner configured to obtain a set of navigational instructions describing a route to a destination;
an object detector configured to obtain first image data through the first camera of that is oriented toward the route, the first image data depicting a first scene associated with the route;
an attention detector configured to:
obtain second image data captured through the second camera oriented toward a user in the vehicle that is navigating the route to the destination;
store field-of-view information including at least one angle associated with an orientation of the head of the user, wherein the at least one angle comprises an azimuthal angle or an elevational angle; and
determine a first field of view associated with the user based on a gaze of the user in the second image data determined using the at least one artificial neural network, wherein the field of view is based on the field-of-view information;
one or more processors configured to identify at least one salient object represented in the first scene based on the first field of view; and
an object instruction component configured to output instructional information identifying the at least one salient object, at the at least one of the display or the speaker, describing a first navigational instruction of the set of navigational instructions with reference to the at least one salient object, wherein the first navigational instruction indicates at least one of a distance and/or a direction of travel with reference to the at least one salient object;
wherein the one or more processors are further configured to reconfigure, based on the first scene, at least one or more settings of a microphone, the first camera, the second camera, the display, or the speaker.

11. The vehicle of claim 10, wherein the attention detector is further configured to determine the gaze of the user by processing the second image data using a deep neural network (DNN) implemented by the at least one artificial neural network.

12. The vehicle of claim 10, wherein the attention detector is further configured to store the field-of-view information before the navigation planner obtains the set of navigational instructions describing the route to the destination.

13. The vehicle of claim 10, wherein the object detector is further configured to process the first image data using a first deep neural network (DNN) implemented by the at least one artificial neural network for identification of a set of objects represented in the first scene, and wherein the identifying the at least one salient object represented in the first scene based on the first field of view is further based on the set of objects represented in the first scene.

14. The vehicle of claim 13, wherein the object detector configured to identify the at least one salient object represented in the first scene based on the first field of view is further configured to process the set of objects using a second DNN implemented by the at least one artificial neural network for identification of the at least one salient object that is estimated to be at least partially within the first field of view.

15. The vehicle of claim 14, wherein the one or more processors are further configured to adjust one or more weights associated with the second DNN based on the first field of view to influence a saliency of the at least one salient object.

16. The vehicle of claim 15, wherein the one or more weights are adjusted based at least in part on a profile associated with the user, the profile being based on at least one of an age associated with the user, a sex associated with the user, a driving experience level associated with the user, a preference associated with the user, historical information associated with the user, or a location associated with the user.

17. The vehicle of claim 10, wherein the first image data depicts the first scene over a plurality of time steps, and the at least one salient object is in motion over the plurality of time steps.

18. The vehicle of claim 17, wherein the one or more processors are further configured to determine that the at least one salient object is in motion, wherein the instructional information describing the first navigational instruction of the set of navigational instructions with reference to the at least one salient object is based on the motion of the at least one salient object.

19. A system for providing navigational instructions using at least one artificial neural network, the system comprising:
    a vehicle comprising a first camera, a second camera, and at least one of a display or a speaker;
    a memory; and
    at least one processor coupled to the memory and configured to:
        obtain a set of navigational instructions describing a route to a destination;
        obtain first image data through the first camera that is oriented toward the route, the first image data depicting a first scene associated with the route;
        obtain second image data captured through the second camera oriented toward a user in the vehicle that is navigating the route to the destination;
        store, at the memory, field-of-view information including at least one angle associated with an orientation of the head of the user, wherein the at least one angle comprises an azimuthal angle or an elevational angle;
        determine a first field of view associated with the user based on a gaze of the user in the second image data determined using the at least one artificial neural network, wherein the first field of view is based on the field-of-view information;
        identify at least one salient object represented in the first scene based on the first field of view;
        output instructional information, at the at least one of the display or the speaker, identifying the at least one salient object and describing a first navigational instruction of the set of navigational instructions with reference to the at least one salient object, wherein the first navigational instruction indicates at least one of a distance and/or a direction of travel with reference to the at least one salient object; and
        reconfigure, based on the first scene, at least one or more settings of a microphone, the first camera, the second camera, the display, or the speaker.

20. The system of claim 19, wherein the at least one processor is further configured to process the first image data using a first deep neural network (DNN) implemented by the at least one artificial neural network for identification of a set of objects represented in the first scene, wherein the identifying the at least one salient object represented in the first scene based on the first field of view is further based on the set of objects represented in the first scene.

21. The system of claim 20, wherein the identification of the at least one salient object represented in the first scene based on the first field of view comprises to process the set of objects using a second DNN implemented by the at least one artificial neural network for identification of the at least one salient object that is estimated to be at least partially within the first field of view.

22. The system of claim 21, wherein the at least one processor is further configured to adjust one or more weights associated with the second DNN based on the first field of view to influence a saliency of the at least one salient object.

23. The system of claim 19, wherein the first image data depicts the first scene over a plurality of time steps, and the at least one salient object is in motion over the plurality of time steps.

24. The system of claim 23, wherein the at least one processor is further configured to determine the at least one salient object is in motion based on the first image data, wherein the instructional information describing the first navigational instruction of the set of navigational instructions with reference to the at least one salient object is based on the motion of the at least one salient object.

25. A computer-readable medium storing computer-executable code for providing navigational instructions in a vehicle using at least one artificial neural network, include code to:
    obtain a set of navigational instructions describing a route to a destination;
    obtain first image data through a first camera of the vehicle that is oriented toward the route, the first image data depicting a first scene associated with the route;
    obtain second image data captured through a second camera of the vehicle oriented toward a user in the vehicle that is navigating the route to the destination;
    store field-of-view information including at least one angle associated with an orientation of the head of the user, wherein the at least one angle comprises an azimuthal angle or an elevational angle;
    determine a first field of view associated with the user based on a gaze of the user in the second image data determined using the at least one artificial neural network, wherein the first field of view is based on the field-of-view information;
    identify at least one salient object represented in the first scene based on the first field of view;
    output instructional information, to at least one of a display or a speaker of the vehicle, describing a first navigational instruction of the set of navigational instructions with reference to the at least one salient object, wherein the first navigational instruction indicates at least one of a distance or a direction of travel with reference to the at least one salient object; and
    reconfigure, based on the first scene, at least one or more settings of a microphone, the first camera, the second camera, the display, or the speaker.

* * * * *